(12) United States Patent
Yamasaki et al.

(10) Patent No.: US 9,690,220 B2
(45) Date of Patent: *Jun. 27, 2017

(54) POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJI XEROX CO., LTD., Tokyo (JP)

(72) Inventors: Sumiaki Yamasaki, Kanagawa (JP); Shiori Chonan, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 14/613,440

(22) Filed: Feb. 4, 2015

(65) Prior Publication Data

US 2016/0011531 A1  Jan. 14, 2016

(30) Foreign Application Priority Data

Jul. 14, 2014 (JP) .................. 2014-144519

(51) Int. Cl.
 *G03G 9/087* (2006.01)
 *C08G 63/672* (2006.01)
 *G03G 9/08* (2006.01)
(52) U.S. Cl.
 CPC ....... *G03G 9/08755* (2013.01); *C08G 63/672* (2013.01); *G03G 9/081* (2013.01); *G03G 9/0806* (2013.01); *G03G 9/08797* (2013.01)
(58) Field of Classification Search
 CPC ........... G03G 9/08726; G03G 9/08755; G03G 9/08791; G03G 9/08795
 See application file for complete search history.

(56) References Cited

U.S. PATENT DOCUMENTS 8,628,902 B2 * 1/2014 Yamasaki ............ C08G 63/672
                                                   399/252
8,652,731 B2 * 2/2014 Sasaki .................. C08G 63/672
                                                   399/252

(Continued)

FOREIGN PATENT DOCUMENTS

JP         4699559 B1    6/2011
JP       2012-229419 A  11/2012

(Continued)

*Primary Examiner* — Peter Vajda
(74) *Attorney, Agent, or Firm* — Sughrue Mion, PLLC

(57) ABSTRACT

A polyester resin for toner includes a repeating unit that is derived from a diol represented by the following formula (1), and a repeating unit that is derived from a dicarboxylic acid not having a double carbon-carbon bond:

$$HO-\underset{\underset{A^1}{L^2}}{\overset{\overset{R^1}{|}}{C}}-L^1-\underset{\underset{A^2}{L^3}}{\overset{\overset{R^2}{|}}{C}}-OH \quad (1)$$

wherein $R^1$ and $R^2$ each independently represents hydrogen or a methyl group, $L^1$ represents a divalent linking group selected from the group consisting of an ether group, a chain alkylene group, a cyclic alkylene group, and combinations thereof, $L^2$ and $L^3$ each independently represent a divalent linking group selected from the group consisting of a carbonyl group, an ester group, an ether group, a sulfonyl group, a chain alkylene group, a cyclic alkylene group, an arylene group, and combinations thereof, $L^1$ and $L^2$, or $L^1$ (Continued)

and $L^3$ may form a ring, and $A^1$ and $A^2$ each independently represent a rosin ester group derived from a hydrogenated rosin.

11 Claims, 2 Drawing Sheets

(56) References Cited

U.S. PATENT DOCUMENTS

| | | | | |
|---|---|---|---|---|
| 8,663,889 | B2* | 3/2014 | Yamasaki | C08G 63/40 |
| | | | | 399/252 |
| 8,808,956 | B2* | 8/2014 | Chonan | C08G 63/672 |
| | | | | 399/252 |
| 8,883,387 | B2* | 11/2014 | Miyata | G03G 9/08755 |
| | | | | 399/252 |
| 8,951,706 | B2* | 2/2015 | Matsuoka | C08G 63/672 |
| | | | | 399/252 |
| 9,005,860 | B2* | 4/2015 | Miyata | G03G 9/08775 |
| | | | | 430/109.1 |
| 9,102,790 | B2* | 8/2015 | Chonan | C08G 63/553 |
| 9,285,696 | B2* | 3/2016 | Shinya | G03G 9/08726 |
| 2010/0291481 | A1* | 11/2010 | Yamada | G03G 9/08704 |
| | | | | 430/108.2 |
| 2012/0264041 | A1 | 10/2012 | Yamasaki et al. | |
| 2013/0022905 | A1 | 1/2013 | Sasaki et al. | |
| 2013/0022906 | A1 | 1/2013 | Chonan et al. | |
| 2013/0022908 | A1 | 1/2013 | Shiozaki et al. | |
| 2013/0029264 | A1 | 1/2013 | Matsuoka et al. | |
| 2013/0071785 | A1 | 3/2013 | Moroiwa et al. | |
| 2013/0084520 | A1 | 4/2013 | Miyata et al. | |
| 2013/0124479 | A1 | 5/2013 | Namjoshi et al. | |
| 2013/0188986 | A1 | 7/2013 | Yamasaki et al. | |

FOREIGN PATENT DOCUMENTS

| | | |
|---|---|---|
| JP | 5267701 B2 | 8/2013 |
| JP | 5267702 B2 | 8/2013 |

* cited by examiner

POLYESTER RESIN FOR TONER, ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2014-144519 filed Jul. 14, 2014.

BACKGROUND

Technical Field

The present invention relates to a polyester resin for toner, an electrostatic charge image developing toner, an electrostatic charge image developer, a toner cartridge, a process cartridge, and an image forming apparatus.

SUMMARY

According to an aspect of the invention, there is provided a polyester resin for toner including:

a repeating unit that is derived from a diol represented by the following formula (1); and a repeating unit that is derived from a dicarboxylic acid not having a double carbon-carbon bond:

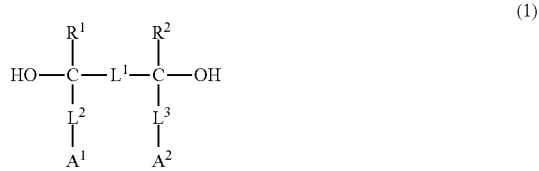

wherein $R^1$ and $R^2$ each independently represents hydrogen or a methyl group; $L^1$ represents a divalent linking group selected from the group consisting of an ether group, a chain alkylene group, a cyclic alkylene group, and combinations thereof; $L^2$ and $L^3$ each independently represent a divalent linking group selected from the group consisting of a carbonyl group, an ester group, an ether group, a sulfonyl group, a chain alkylene group, a cyclic alkylene group, an arylene group, and combinations thereof; $L^1$ and $L^2$, or $L^1$ and $L^3$ may form a ring; and $A^1$ and $A^2$ each independently represent a rosin ester group derived from a hydrogenated rosin.

BRIEF DESCRIPTION OF THE DRAWINGS

Exemplary embodiments of the present invention will be described in detail based on the following figures, wherein.

DETAILED DESCRIPTION

Figure 1:
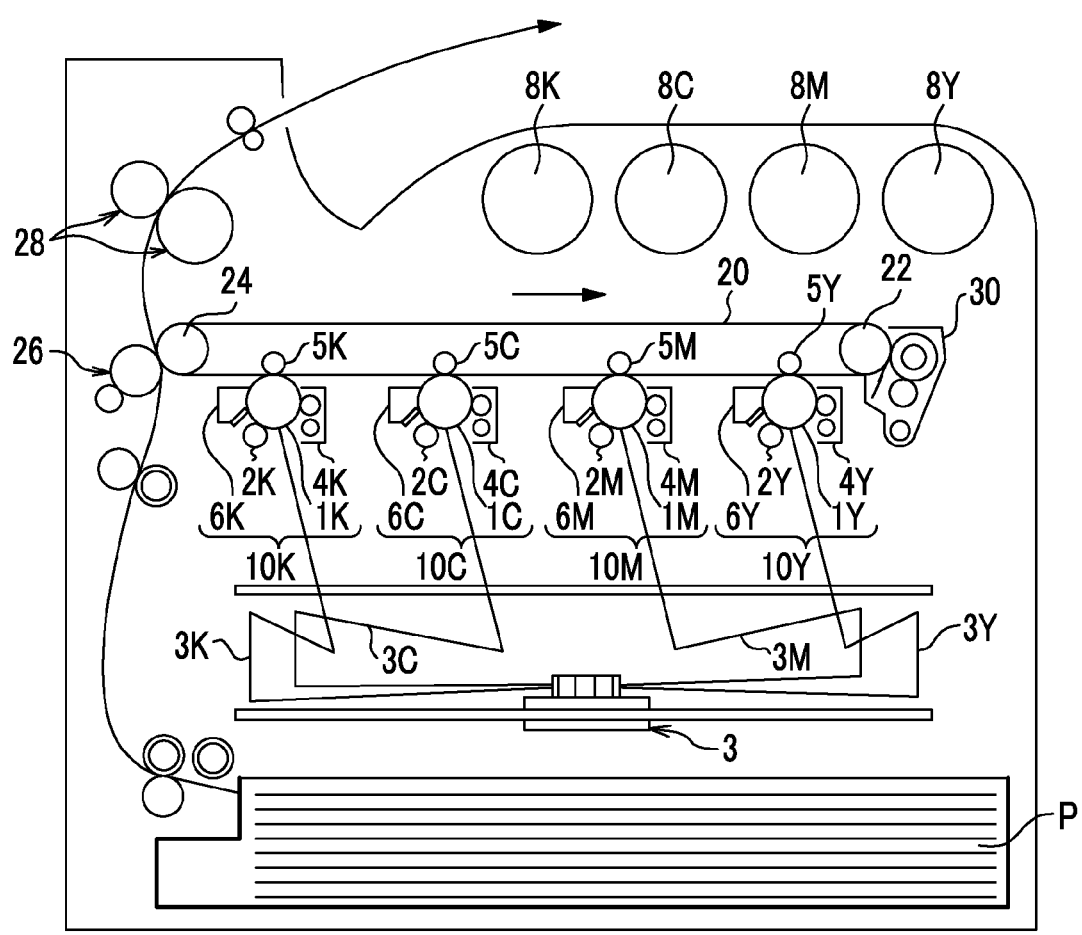
FIG. 1 is a configuration diagram schematically illustrating an example of an image forming apparatus according to an exemplary embodiment of the invention.

Hereinafter, exemplary embodiments of the invention will be described below. The description of these exemplary embodiments and examples are merely examples of the invention and do not limit the scope of the invention.

Polyester Resin for Toner

A polyester resin for toner according to an exemplary embodiment of the invention includes: a repeating unit that is derived from a diol represented by the following formula (1); and a repeating unit that is derived from a dicarboxylic acid not having a double carbon-carbon bond.

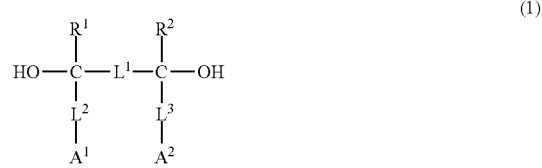

In the formula (1), $R^1$ and $R^2$ each independently represents hydrogen or a methyl group; $L^1$ represents a divalent linking group selected from the group consisting of an ether group, a chain alkylene group, a cyclic alkylene group, and combinations thereof; $L^2$ and $L^3$ each independently represent a divalent linking group selected from the group consisting of a carbonyl group, an ester group, an ether group, a sulfonyl group, a chain alkylene group, a cyclic alkylene group, an arylene group, and combinations thereof; $L^1$ and $L^2$, or $L^1$ and $L^3$ may form a ring; and $A^1$ and $A^2$ each independently represent a rosin ester group derived from a hydrogenated rosin.

The hydrogenated rosin described in this specification refers to a rosin which is hydrogenated to eliminate an unstable conjugated double bond in a molecule therefrom. Typically, the hydrogenated rosin is a mixture of tetrahydroabietic acid and dihydroabietic acid.

The rosin ester group described in this specification refers to a residue which is obtained by excluding a hydrogen atom from a carboxyl group included in a rosin. The rosin ester group derived from a hydrogenated rosin refers to a residue which is obtained by excluding a hydrogen atom from a carboxyl group included in a hydrogenated rosin. Hereinafter, the rosin ester group derived from a hydrogenated rosin will also be referred to as "hydrogenated rosin ester group".

In addition, in this specification, a rosin ester group derived from a disproportionated rosin and a rosin ester group derived from a refined rosin will also be referred to as "disproportionated rosin ester group" and "refined rosin ester group", respectively.

The rosin diol described in this specification refers to a diol having at least one rosin ester group.

Hereinafter, the diol represented by the formula (1) will also be referred to as "specific rosin diol". The polyester resin for toner according to the exemplary embodiment will also be referred to as "specific polyester". The dicarboxylic acid not having a double carbon-carbon bond will also be referred to as "saturated dicarboxylic acid", and the dicarboxylic acid having a double carbon-carbon bond will also be referred to as "unsaturated dicarboxylic acid". The unsaturated dicarboxylic acid includes an unsaturated aliphatic dicarboxylic acid and an aromatic dicarboxylic acid.

The present inventors have found that, among polyesters having a rosin ester group in a branch thereof (hereinafter, referred to as "rosin ester group-containing polyesters"), a polyester having a hydrogenated rosin ester group is superior in adhesion to paper as compared to a polyester having a disproportionated rosin ester group or a refined rosin ester group instead of a hydrogenated rosin ester group. The reason is presumed to be that the hydrogenated rosin ester group has higher hydrophobicity than that of the disproportionated rosin ester group and the refined rosin ester group. In addition, the hydrogenated rosin ester group has lower rigidity and less effect of an increase in the softening temperature of the polyester, as compared to the disproportionated rosin ester group and the refined rosin ester group. Therefore, it is considered that the polyester having a hydrogenated rosin ester group is more easily fixed to paper even at a low fixing temperature (for example, 150° C. or lower) as compared to the polyester having a disproportionated rosin ester group or a refined rosin ester group instead of a hydrogenated rosin ester group.

Further, the present inventors have found that a rosin ester group-containing polyester having a saturated dicarboxylic acid as a polymer component is superior in adhesion to paper as compared to a polyester not having a saturated dicarboxylic acid as a polymer component, that is, a polyester having only an unsaturated dicarboxylic acid as a dicarboxylic acid, as a polymer component. It is considered that, when the carbon-carbon bond in a constitutional unit derived from a dicarboxylic acid is saturated, the melt viscosity of the polyester decreases, and the polyester is rapidly deformed when being heated; therefore, the fixing property is superior even at a low fixing temperature.

In addition, when the unsaturated aliphatic dicarboxylic acid is used among the unsaturated dicarboxylic acids, an unsaturated group in the molecule functions as a crosslinking point to crosslink a polymer, and the softening temperature of the polyester increases. Therefore, when the saturated dicarboxylic acid is used as a polymer component, the amount of the unsaturated aliphatic dicarboxylic acid used relatively decreases, and an increase in the softening temperature of the polyester is prevented. As a result, it is considered that the fixing property is superior even at a low fixing temperature.

In addition, the saturated dicarboxylic acid has higher reactivity than the unsaturated dicarboxylic acid, in particular, the aromatic dicarboxylic acid. Therefore, the amount of the dicarboxylic acid which remains inactive in the polyester decreases. The dicarboxylic acid is a highly hydrophilic compound, and thus when the amount of the dicarboxylic acid remaining in the polyester is small, the adhesion of toner to paper is superior.

It is preferable that the amount of the dicarboxylic acid (also referred to as "residual dicarboxylic acid") which remains inactive in the specific polyester according to the exemplary embodiment decreases from the viewpoint of the fixing property. Specifically, the amount of the residual dicarboxylic acid is preferably 2.0% by weight, more preferably 1.5% by weight, still more preferably 1.3% by weight, yet still more preferably 1.2% by weight, and even yet still more preferably 1.0% by weight. The amount of the residual dicarboxylic acid is most preferably substantially 0% by weight.

Due to a synergistic effect between the effect obtained by the hydrogenated rosin ester group being included and the effect obtained by the saturated dicarboxylic acid being included as a polymer component, the specific polyester according to the exemplary embodiment has a high fixing property to paper even at a low or high fixing temperature. Accordingly, a polyester resin for toner which may be used in a wide fixing temperature range may be provided. In addition, the specific polyester according to the exemplary embodiment is superior in the fixing property to paper, and thus an image is not likely to be peeled off when the paper is bent.

Hereinafter, the constitutional units and the like of the specific polyester according to the exemplary embodiment will be described in detail.

Diol

The specific polyester according to the exemplary embodiment includes the diol represented by the formula (1) as a polymer component and may further include other diols as a polymer component. That is, the polyester resin according to the exemplary embodiment may contain plural repeating units derived from alcohols.

In the formula (1), $R^1$ and $R^2$ each independently represents hydrogen or a methyl group. $R^1$ and $R^2$ may be the same as or different from each other, but preferably the same as each other.

In the formula (1), $L^1$ represents a divalent linking group selected from the group consisting of an ether group, a chain alkylene group, a cyclic alkylene group, and combinations thereof. The chain alkylene group and the cyclic alkylene group may have a substituent other than an aromatic group.

When $L^1$ represents the above-described linking group, the SP value of the specific rosin diol is easily adjusted to be within an appropriate range, the SP value of the polyester is easily adjusted to be within an appropriate range, and the compatibility between a release agent (for example, various waxes), which is added to the toner, and the polyester is controlled to be within an appropriate range. When the SP value is excessively high, the adhesion of the polyester to paper may be poor. When the SP value is excessively low, the polyester is likely to be highly compatible with wax, and thus the releasing property is likely to be lost.

The lower limit of the SP value of the specific rosin diol is preferably 8.7 or higher, more preferably 8.8 or higher, and still more preferably 9.0 or higher. The upper limit of the SP value of the specific rosin diol is preferably 9.4 or lower, more preferably 9.3 or lower, and still more preferably 9.2 or lower.

The SP value of the specific polyester is preferably from 8.5 to 10.0 and more preferably from 8.5 to 9.5.

The SP values (solubility parameter) of the rosin diol and the polyester according to the exemplary embodiment are calculated using a Fedor method. Specifically, the SP value is calculated using the following expression.

$$SP \text{ Value} = \sqrt{(Ev/v)} = \sqrt{(\Sigma \Delta ei / \Sigma \Delta vi)} \quad \text{Expression:}$$

(wherein,

Ev: evaporation energy (cal/mol), v: molar volume (cm$^3$/mol), $\Delta ei$: evaporation energy of each of atoms or an atom group, $\Delta vi$: molar volume of each of atoms or an atom group)

The details of this calculating method are described in, for example, Polym. Eng. Sci., vol. 14, p. 147 (1974), "Polymer with Practical Applications for Engineers" (p. 66, Junji Mukai et al., Kodansha Scientific, 1981), and Polymer Handbook (4th edition, A Willey-Interscience Publication), and the same method is applied to the exemplary embodiment.

(cal/cm$^3$)$^{1/2}$ is adopted for the unit of the SP values, but in the exemplary embodiment, the unit will be omitted in accordance with customs, and the SP values will be represented in a dimensionless form.

In the formula (1), $L^2$ and $L^3$ each independently represent a divalent linking group selected from the group consisting of a carbonyl group, an ester group, an ether group, a sulfonyl group, a chain alkylene group, a cyclic alkylene group, an arylene group, and combinations thereof. The chain alkylene group, the cyclic alkylene group, and the arylene group may have a substituent. $L^2$ and $L^3$ may be the same as or different from each other, but preferably the same as each other. $L^1$ and $L^2$, or $L^1$ and $L^3$ may form a ring.

Examples of the chain alkylene groups represented by $L^1$, $L^2$, and $L^3$ include a linear or branched chain alkylene group having from 1 to 10 carbon atoms (preferably from 1 to 6 carbon atoms).

Examples of the cyclic alkylene groups represented by $L^1$, $L^2$, and $L^3$ include a cyclic alkylene group having from 3 to 7 carbon atoms (preferably from 3 to 6 carbon atoms).

Example of the arylene group represented by $L^2$ and $L^3$ include a phenylene group, a naphthylene group, and an anthracene group.

Examples of the substituent of the chain alkylene group, the cyclic alkylene group, and the arylene group include an alkyl group having from 1 to 8 carbon atoms and an aryl group. Among these, a linear, branched, or cyclic alkyl group is preferably used. Specific examples of the substituent include a methyl group, an ethyl group, a propyl group, a butyl group, a pentyl group, a hexyl group, a heptyl group, an octyl group, an isopropyl group, an isobutyl group, an s-butyl group, a t-butyl group, an isopentyl group, a neopentyl group, an 1-methylbutyl group, an isohexyl group, a 2-ethylhexyl group, a 2-methylhexyl group, a cyclopentyl group, a cyclohexyl group, and a phenyl group.

As $L^1$, —C—O-$L^4$-O—C— is preferably used. Here, $L^4$ represents a divalent linking group selected from the group consisting of an ether group, a chain alkylene group, a cyclic alkylene group, and combinations thereof. Examples of the chain alkylene group represented by $L^4$ include a linear or branched alkylene group having from 1 to 8 carbon atoms (preferably from 1 to 6 carbon atoms). Examples of the cyclic alkylene group represented by $L^4$ include a cyclic alkylene group having from 3 to 6 carbon atoms.

As $L^2$ and $L^3$, a divalent linking group selected from a linear or branched chain alkylene group having from 1 to 10 carbon atoms (preferably from 1 to 6 carbon atoms), a cyclic alkylene group having from 3 to 7 carbon atoms (preferably from 3 to 6 atoms), and combinations thereof is preferably used, and a linear or branched chain alkylene group having from 1 to 4 carbon atoms is more preferably used.

In the formula (1), $A^1$ and $A^2$ each independently represent a rosin ester group derived from a hydrogenated rosin. That is, the specific rosin diol refers to the diol having two hydrogenated rosin ester groups in one molecule. It is preferable that $A^1$ and $A^2$ each independently represent a rosin ester group derived from tetrahydroabietic acid or a rosin ester group derived from dihydroabietic acid. $A^1$ and $A^2$ may the same as or different from each other. It is preferable that $A^1$ and $A^2$ be a rosin ester group derived from tetrahydroabietic acid from the viewpoint of the low-temperature fixing property.

Hereinafter, an example of a synthesis scheme of the specific polyester according to the exemplary embodiment will be described. In the following synthesis scheme, a rosin diol is synthesized by allowing a bifunctional epoxy compound and a rosin to react with each other, and a polyester is synthesized by dehydration polycondensation of the rosin diol and a dicarboxylic acid. In a formula representing the polyester, a portion surrounded by a dotted line corresponds to the rosin ester group.

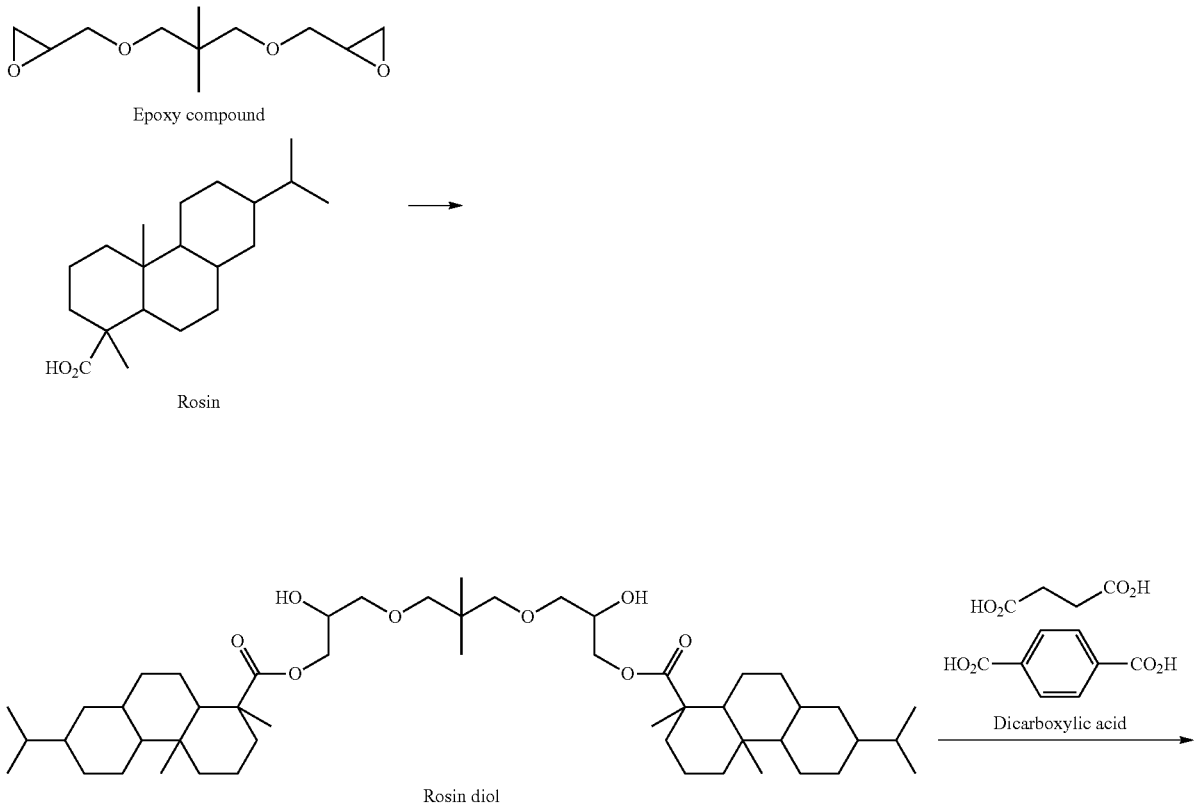

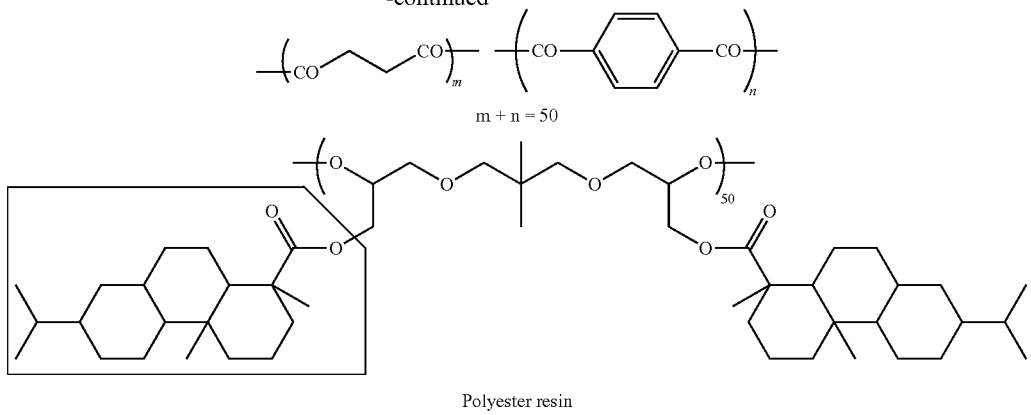

Polyester resin

The polyester obtained by the dehydration polycondensation of the rosin diol and the dicarboxylic acid is hydrolyzed into monomers as shown in the following scheme example during hydrolysis. The components of the polyester may be presumed from these hydrolysates.

compound include diglycidyl ethers of aliphatic diols, diglycidyl ethers of alicyclic diols, and alicyclic epoxides.

Representative examples of the aliphatic diol components of the diglycidyl ethers of aliphatic diols include ethylene

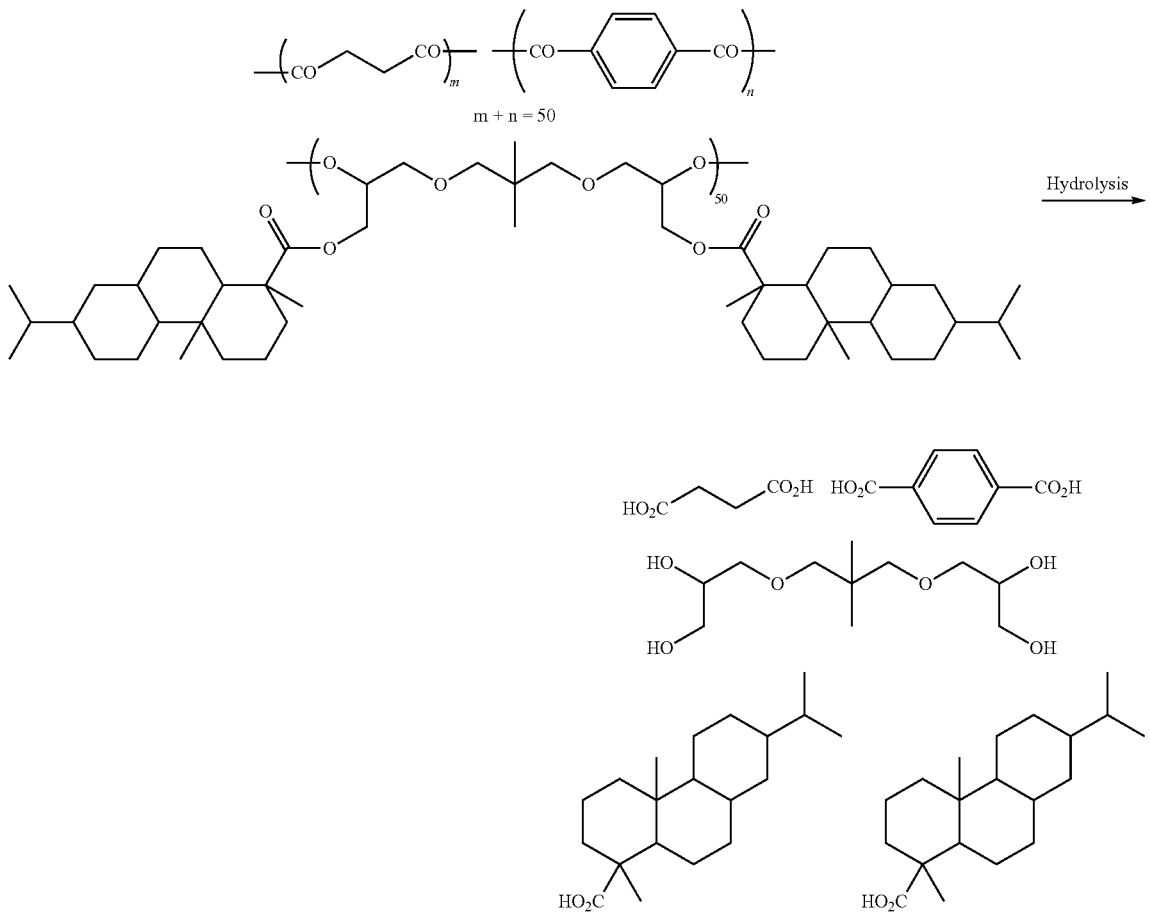

The specific rosin diol according to the exemplary embodiment may be synthesized using a well-known method, for example, may be synthesized by allowing a bifunctional epoxy compound and a hydrogenated rosin to react with each other. Examples of the bifunctional epoxy glycol, 1,2-propanediol, 1,3-propanediol, 1,4-butanediol, 1,5-pentanediol, 1,6-hexanediol, neopentyl glycol, 1,9-nonanediol, diethylene glycol, triethylene glycol, polyethylene glycol, polypropylene glycol, and polytetramethylene glycol.

Representative examples of the alicyclic diol components of the diglycidyl ethers of alicyclic diols include hydrogenated bisphenol A, derivatives of hydrogenated bisphenol A, such as polyalkylene oxide adducts of hydrogenated bisphenol A, and cyclohexanedimethanol.

Representative examples of the alicyclic epoxides include limonene dioxide.

In the exemplary embodiment, the reaction between the rosin and the bifunctional epoxy compound is usually carried out by a ring-opening reaction between a carboxyl group of the rosin and an epoxy group of the bifunctional epoxy compound. At this time, the reaction temperature is preferably higher than or equal to the melting temperatures of both of the components or at a temperature at which both of the components may be uniformly mixed. Specifically, the reaction temperature is usually within a range from 60° C. to 200° C. During the reaction, a catalyst may be added to promote the ring-opening reaction of the epoxy group.

Examples of the catalyst include amines such as ethylenediamine, trimethylamine, and 2-methyl imidazole; quaternary ammonium salts such as triethylammonium bromide, triethylammonium chloride and butyltrimethylammonium chloride; and triphenylphosphine.

For example, the batch-type reaction is carried out by putting the rosin and the bifunctional epoxy compound into a flask, which is equipped with a cooling tube, a stirrer, an inert gas introducing port, a thermometer, and the like, and heating the mixture. The progress of the reaction may be verified by a decrease in the acid value of a reactant, and the reaction may be stopped at or near a stoichiometric endpoint.

In this specification, the rosin is a generic term for resin acids obtained from trees and is a material derived from a natural product including abietic acid, which is a tricyclic diterpene, and an isomer thereof as a major component. Examples of specific components of the rosin include, in addition to abietic acid, palustric acid, neoabietic acid, pimaric acid, dehydroabietic acid, isopimaric acid, and sandaracopimaric acid. The rosin used in the exemplary embodiment is a mixture of the above-described components.

Depending on the collecting method, the rosin may be broadly classified into three types of rosins: tall rosin made from pulp; gum rosin made from crude turpentine; and wood rosin made from pine stump. As the rosin used in the exemplary embodiment, gum rosin or tall rosin is preferably used from the viewpoint of availability.

It is preferable that these rosins are refined. A refined rosin is obtained by removing a polymer which is considered to be derived from a peroxide of a resin acid included in a crude rosin, or removing a non-saponified material included in a crude rosin. The refining method is not particularly limited and may be selected from various well-known refining methods.

The refined rosin described in this specification is obtained by refining a rosin, and includes abietic acid as a major component.

The disproportionated rosin described in this specification is obtained by heating a rosin in the presence of a disproportionation catalyst to eliminate an unstable conjugated double bond in a molecule therefrom, and is typically a mixture of dehydroabietic acid and dihydroabietic acid.

For example, the disproportionated rosin is obtained by heating a crude rosin or a refined rosin in the presence of a disproportionation catalyst. Examples of the disproportionation catalyst include various well known catalysts, for example, supported catalysts such as palladium carbon, rhodium carbon, and platinum carbon; powders of metals such as nickel or platinum; iodine and iodides such as iron iodide; and phosphorus compounds. The amount of the catalyst used with respect to the rosin is typically from 0.01% by weight to 5% by weight and preferably from 0.01% by weight to 1% by weight, and the reaction temperature is from 100° C. to 300° C. and preferably 150° C. to 290° C.

For example, the hydrogenated rosin is obtained by heating a crude rosin or a refined rosin in the presence of a hydrogenation catalyst under a hydrogenation pressure of from 10 kg/cm$^2$ to 200 kg/cm$^2$ and preferably from 50 kg/cm$^2$ to 150 kg/cm$^2$. Examples of the hydrogenation catalyst include various well known catalysts, for example, supported catalysts such as palladium carbon, rhodium carbon, and platinum carbon; powders of metals such as nickel or platinum; and iodine and iodides such as iron iodide. The amount of the catalyst used with respect to the rosin is typically from 0.01% by weight to 5% by weight and preferably from 0.01% by weight to 1% by weight, and the reaction temperature is from 100° C. to 300° C. and preferably 150° C. to 290° C.

The rosin used in the exemplary embodiment may be a polymerized rosin obtained by polymerization of a rosin, an unsaturated carboxylic acid-modified rosin obtained by adding an unsaturated carboxylic acid to a rosin, and a phenol-modified rosin. Examples of the unsaturated carboxylic acid used for preparation of the unsaturated carboxylic acid-modified rosin include maleic acid, maleic anhydride, fumaric acid, acrylic acid, and methacrylic acid.

Hereinafter, Exemplary Compounds (1) to (20) of the specific rosin diol according to the exemplary embodiment will be shown, but the exemplary embodiment is not limited thereto.

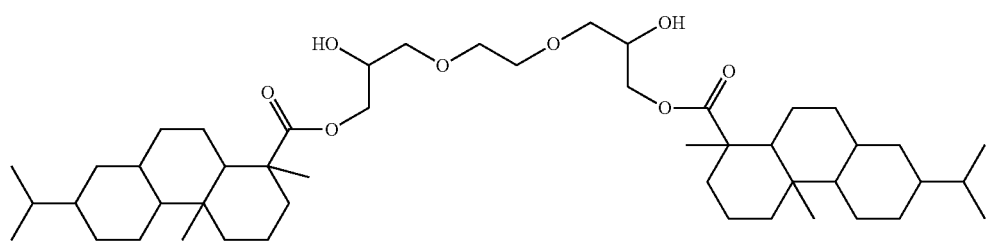 [SMILES: CC(C)C1CCC2C(CCC3C(C)(C(=O)OCC(O)COCCOCC(O)COC(=O)C4(C)CCCC5(C)C6CCC(C(C)C)CC6CCC45)CCCC23C)C1]

(1)

-continued
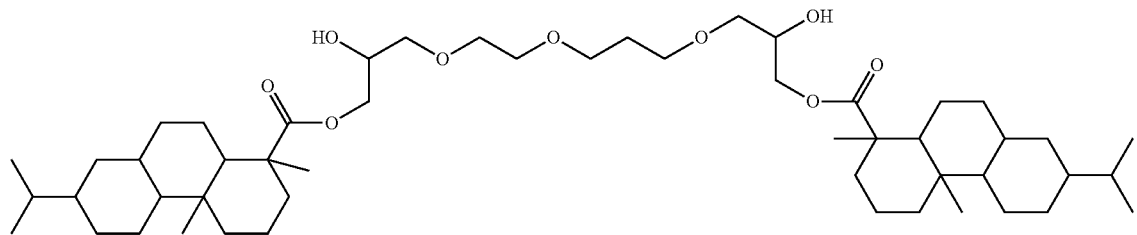 [SMILES: CC(C)C1CCC2C(CCC3C(C)(C(=O)OCC(O)COCCCOCCOCC(O)COC(=O)C4(C)CCCC5(C)C6CCC(C(C)C)CC6CCC45)CCCC23C)C1]
(2)
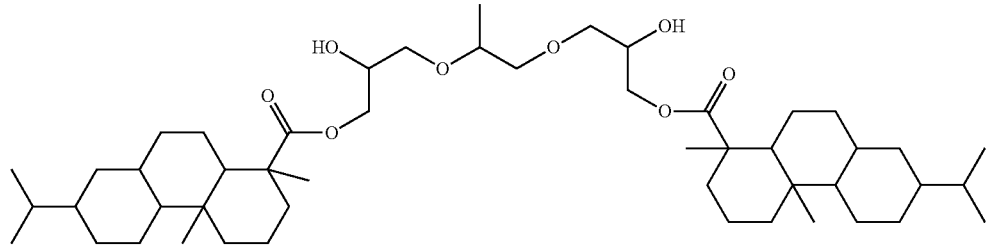 [SMILES: CC(COCC(O)COC(=O)C1(C)CCCC2(C)C3CCC(C(C)C)CC3CCC12)OCC(O)COC(=O)C1(C)CCCC2(C)C3CCC(C(C)C)CC3CCC12]
(3)
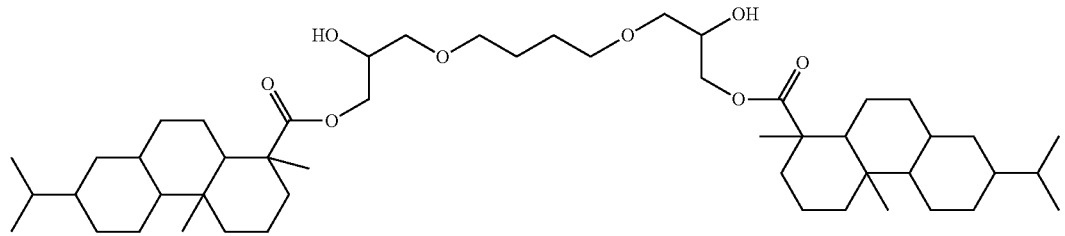 [SMILES: CC(C)C1CCC2C(CCC3C(C)(C(=O)OCC(O)COCCCCOCC(O)COC(=O)C4(C)CCCC5(C)C6CCC(C(C)C)CC6CCC45)CCCC23C)C1]
(4)
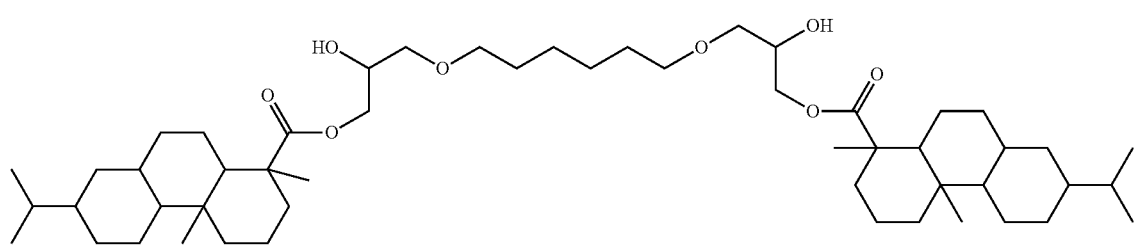 [SMILES: CC(C)C1CCC2C(CCC3C(C)(C(=O)OCC(O)COCCCCCCOCC(O)COC(=O)C4(C)CCCC5(C)C6CCC(C(C)C)CC6CCC45)CCCC23C)C1]
(5)
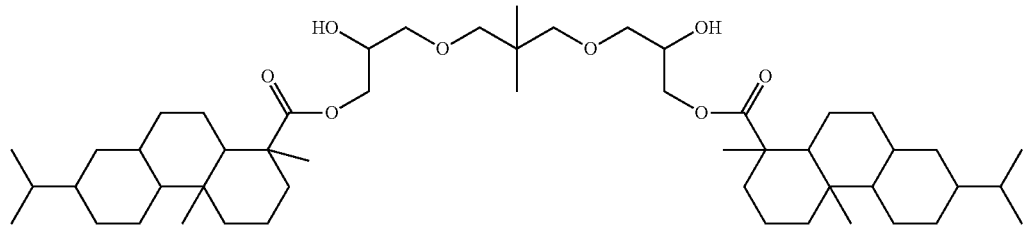
(6)
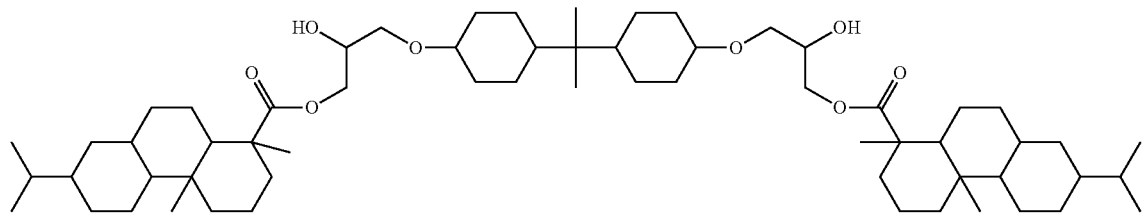
(7)

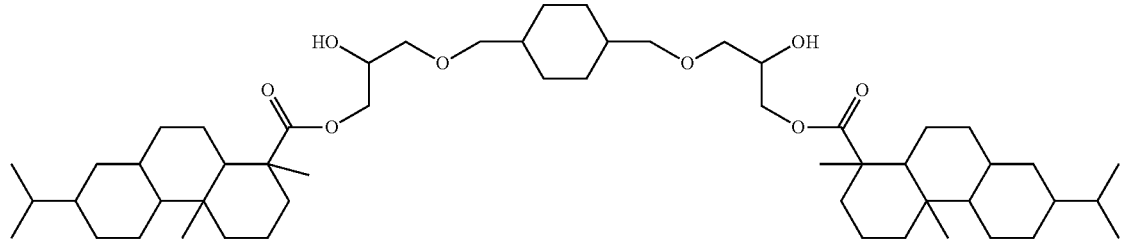
(8)
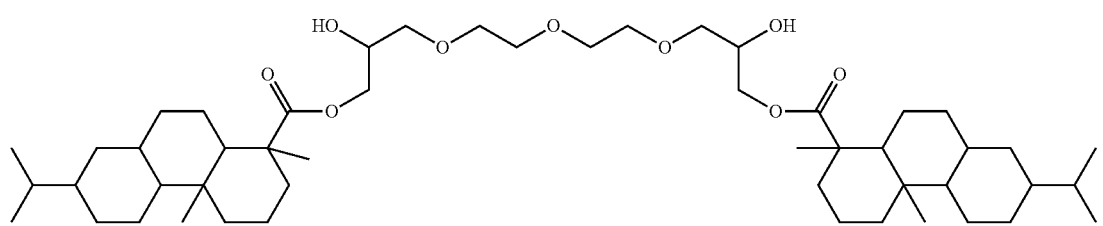
(9)
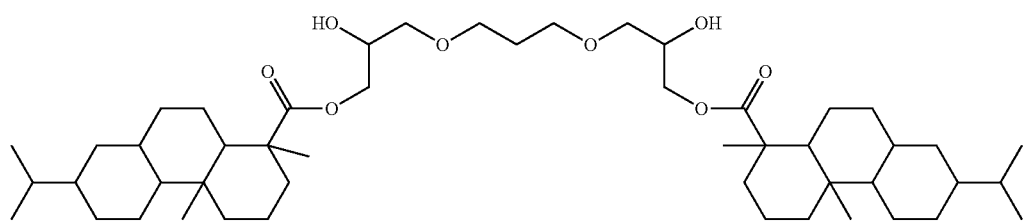
(10)
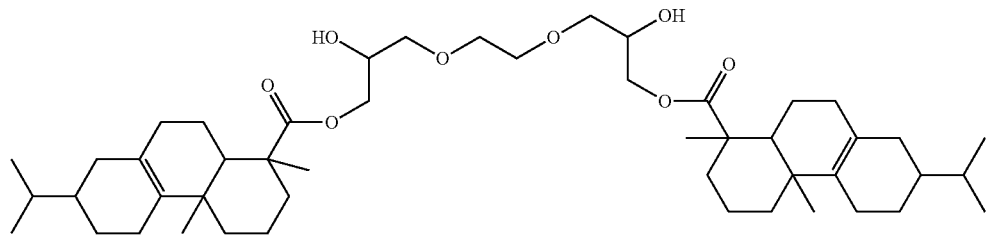
(11)
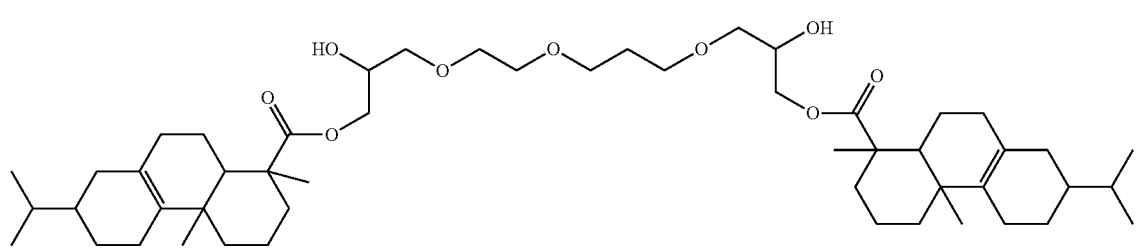
(12)
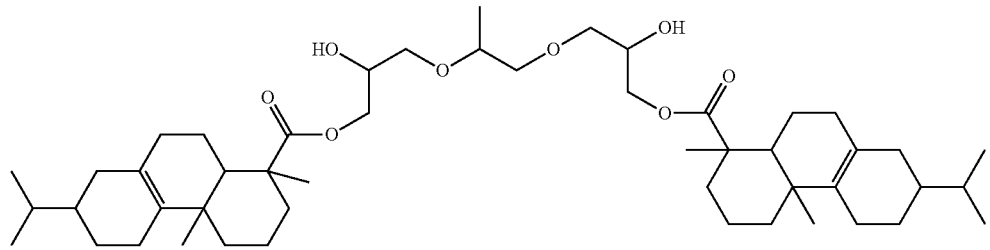
(13)

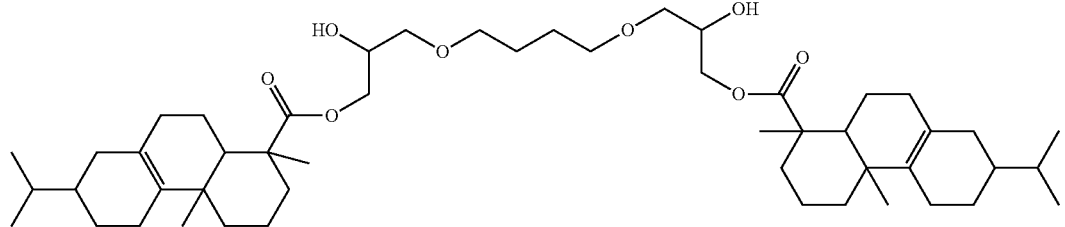
(14)
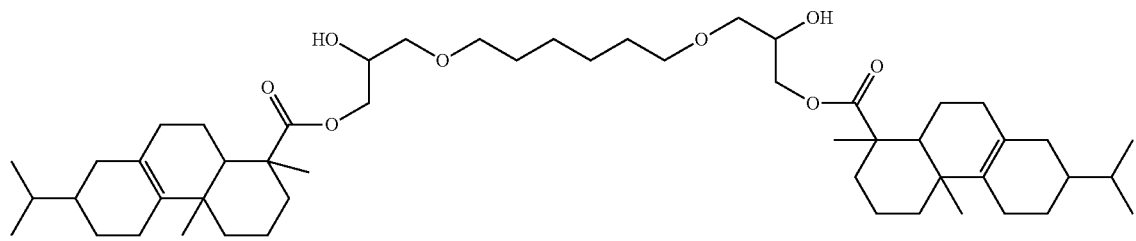
(15)
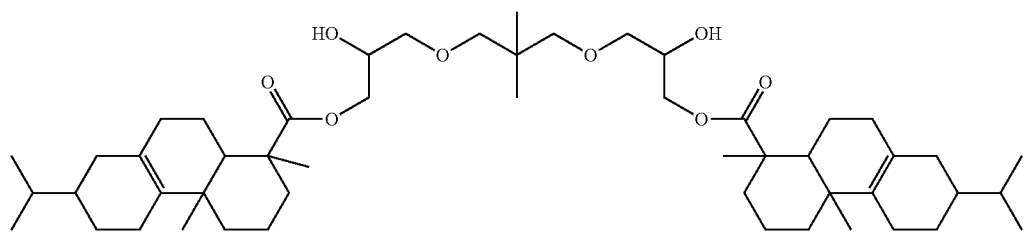
(16)
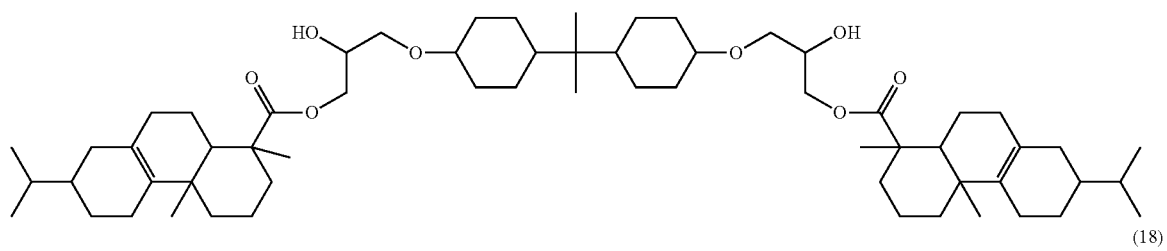
(17)
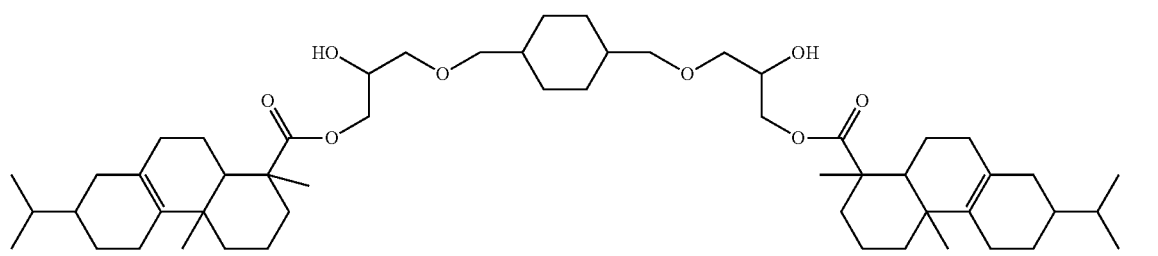
(18)
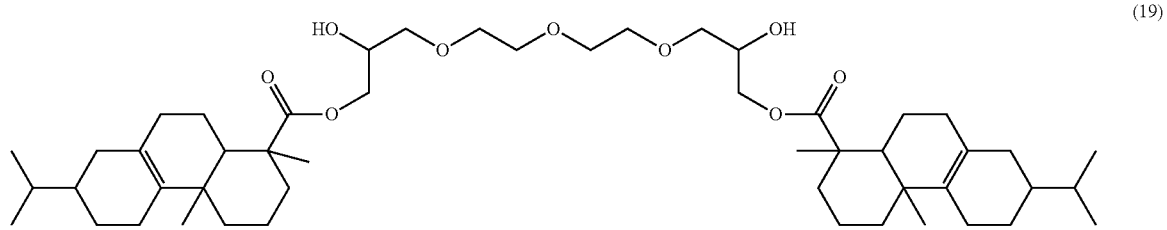
(19)

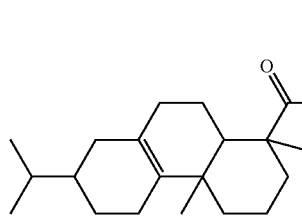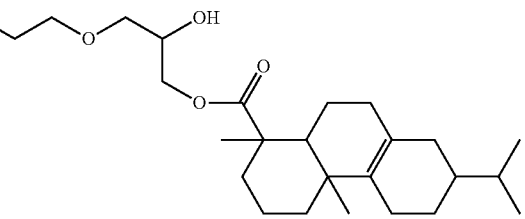

(20)

The specific polyester according to the exemplary embodiment may be formed using diol components other than the specific rosin diol. Examples of the diol components other than the specific rosin diol include a disproportionated rosin ester group-containing rosin diol, a refined rosin ester group-containing rosin diol, an aliphatic diol, and an etherified diphenol.

Examples of the disproportionated rosin ester group-containing rosin diol and the refined rosin ester group-containing rosin diol include compounds described in Japanese Patent No. 5267701 and Japanese Patent No. 5267702.

Examples of the aliphatic diol include ethylene glycol, 1,2-propanediol, 1,3-propanediol 1,2-butanediol, 1,3-butanediol, 1,4-butanediol, 2,3-butanediol 1,4-butenediol, 2-methyl-1,3-propanediol, 1,5-pentanediol, neopentyl glycol, 2-ethyl-2-methylpropane-1,3-diol, 2-butyl-2-ethylpropane-1,3-diol, 1,6-hexanediol, 3-methyl-1,5-pentanediol, 2-ethyl-1,3-hexanediol, 2,4-dimethyl-1,5-pentanediol, 2,2,4-trimethyl-1,3-pentanediol, 1,7-heptanediol, 1,8-octanediol, 1,9-nonanediol, 1,10-decanediol, 3-hydroxy-2,2-dimethylpropyl-3-hydroxy-2,2-dimethyl propanoate, diethylene glycol, triethylene glycol, polyethylene glycol, dipropylene glycol, and polypropylene glycol. Among these aliphatic diols, one kind may be used alone, or two or more kinds may be used in combination.

The etherified diphenol is a diol obtained by an additional reaction of bisphenol A and alkylene oxide. Examples of the alkylene oxide include ethylene oxide or propylene oxide. It is preferable that the average addition molar number of the alkylene oxide is from 2 mol to 16 mol with respect to 1 mol of the bisphenol A.

The specific polyester according to the exemplary embodiment may be formed using a tri- or higher valent polyol within a range where the effects of the exemplary embodiment are not deteriorated. Examples of the tri- or higher valent polyol include glycerin, trimethylolethane, trimethylolpropane, and pentaerythritol. Among these, one kind may be used alone, or two or more kinds may be used in combination. As the tri- or higher valent polyol, glycerin or trimethylolpropane is preferably used from the viewpoints of availability and reactivity.

In the specific polyester according to the exemplary embodiment, regarding a ratio of the specific rosin diol with respect to all the alcohol components, the lower limit thereof is preferably 50% by weight or more, more preferably 55% by weight or more, and still more preferably 60% by weight or more; and the upper limit thereof is preferably 80% by weight or less, more preferably 75% by weight or less, and still more preferably 70% by weight or less from the viewpoint of the charging property and the fixing property of toner.

In the specific polyester according to the exemplary embodiment, regarding the content of the repeating unit derived from the specific rosin diol, the lower limit thereof is preferably 25% by weight or more, more preferably 30% by weight or more, and still more preferably 35% by weight or more; and the upper limit thereof is preferably 55% by weight or less, more preferably 50% by weight or less, and still more preferably 45% by weight or less from the viewpoint of the charging property and the fixing property of toner.

Dicarboxylic Acid

The specific polyester according to the exemplary embodiment includes a saturated dicarboxylic acid as a polymer component and may include an unsaturated dicarboxylic acid as a polymer component. The specific polyester according to the exemplary embodiment may include a tri- or higher valent carboxylic acid as a polymer component.

The saturated dicarboxylic acid is the saturated aliphatic dicarboxylic acid. Examples of the saturated dicarboxylic acid include aliphatic dicarboxylic acids such as oxalic acid, malonic acid, succinic acid, adipic acid, sebacic acid, azelaic acid, and branched chain alkylsuccinic acid having from 1 to 20 carbon atoms; anhydrides of the above-described acids; and alkyl (having from 1 to 3 carbon atoms) esters of the above-described acids. Among these, succinic acid, sebacic acid, azelaic acid, or the like is preferably used from the viewpoints of the durability and fixing property of toner, the dispersibility of a colorant, and availability. Among these aliphatic carboxylic acids, one kind may be used alone, or two or more kinds may be used in combination.

The unsaturated dicarboxylic acid includes an aliphatic dicarboxylic acid having a double carbon-carbon bond (that is, unsaturated aliphatic dicarboxylic acid) and an aromatic dicarboxylic acid. Specific examples of the unsaturated dicarboxylic acid include unsaturated aliphatic dicarboxylic acids such as maleic acid, fumaric acid, citraconic acid, itaconic acid, mesaconic acid, glutaconic acid, dimer acid, and branched chain alkenylsuccinic acid having an alkenyl group of from 1 to 20 carbon atoms; aromatic dicarboxylic acids such as phthalic acid, isophthalic acid, terephthalic acid, 1,4-naphthalenedicarboxylic acid, and 2,6-naphthalenedicarboxylic acid; anhydrides of the above-described acids; and alkyl (having from 1 to 3 carbon atoms) esters of the above-described acids. Among these, isophthalic acid, terephthalic acid, or the like is preferably used from the viewpoints of the durability and fixing property of toner, the dispersibility of a colorant, and availability. Among these carboxylic acids, one kind may be used alone, or two or more kinds may be used in combination.

Examples of the tri- or higher valent carboxylic acid include aromatic carboxylic acids such as trimellitic acid, pyromellitic acid, naphthalene tricarboxylic acid, benzophenone tetracarboxylic acid, biphenyl tetracarboxylic acid, and anhydrides of the above-described acids. Among these, one kind may be used alone, or two or more kinds may be used in combination. As the tri- or higher valent aromatic carboxylic acid, trimellitic anhydride is preferably used from the viewpoints of availability and reactivity.

In the specific polyester according to the exemplary embodiment, regarding a ratio of the saturated dicarboxylic acid with respect to all the carboxylic acids, the lower limit thereof is preferably 1% by weight or more, more preferably 2% by weight or more, and still more preferably 3% by weight or more; and the upper limit thereof is preferably 10% by weight or less, more preferably 8% by weight or less, and still more preferably 7% by weight or less from the viewpoint of the charging property and fixing property of toner.

In the specific polyester according to the exemplary embodiment, regarding the content of the repeating unit derived from the saturated dicarboxylic acid, the lower limit thereof is preferably 1% by weight or more, more preferably 1.5% by weight or more, and still more preferably 2% by weight or more; and the upper limit thereof is preferably 10% by weight or less, more preferably 5% by weight or less, and still more preferably 3% by weight or less from the viewpoint of a balance between the fixing property of toner and other performance.

The specific polyester according to the exemplary embodiment is prepared with a well-known preparation method using an acid component and an alcohol component. As the reaction method, an ester exchange reaction or a direct esterification reaction may be used. In addition, polycondensation may be promoted by a method of increasing a reaction temperature by pressuring, an evacuation method or a method of allowing inert gas to flow at normal pressure. Depending on the reaction, well-known reaction catalysts such as at least one metal compound selected from antimony, titanium, tin, zinc, aluminum, and manganese may be used to promote the reaction. The amount of these reaction catalysts added is preferably from 0.01 part by weight to 1.5 parts by weight and more preferably from 0.05 parts by weight to 1.0 part by weight with respect to 100 parts by weight of the total amount of the acid component and the alcohol component. The reaction temperature is, for example, from 180° C. to 300° C.

The softening temperature of the specific polyester according to the exemplary embodiment is preferably from 90° C. to 130° C. and preferably from 100° C. to 125° C. from the viewpoints of the fixing property, storage stability, and durability of toner.

The glass transition temperature of the specific polyester according to the exemplary embodiment is preferably from 50° C. to 70° C. and more preferably from 55° C. to 65° C. from the viewpoints of the fixing property, storage stability, and durability of toner.

The softening temperature and the glass transition temperature of the specific polyester according to the exemplary embodiment may be adjusted by adjusting a monomer composition, a polymerization initiator, a molecular weight, the amount of a catalyst, and the like or by selecting reaction conditions.

The acid value of the specific polyester according to the exemplary embodiment is preferably from 5 mg KOH/g to 20 mg KOH/g, more preferably from 6 mg KOH/g to 18 mg KOH/g, and still more preferably from 7 mg KOH/g to 15 mg KOH/g from the viewpoint of the charging property and fixing property of toner.

The weight average molecular weight (Mw) of the specific polyester according to the exemplary embodiment is preferably from 10,000 to 100,000, more preferably from 30,000 to 80,000, and still more preferably from 40,000 to 70,000 from the viewpoint of the charging property and fixing property of toner.

The number average molecular weight (Mn) of the specific polyester according to the exemplary embodiment is preferably from 3,000 to 10,000 and more preferably from 4,000 to 8,000 from the viewpoint of the charging property and fixing property of toner.

The specific polyester according to the exemplary embodiment may be a modified polyester. Examples of the modified polyester include polyesters grafted or blocked with phenol, urethane, epoxy, or the like using methods described in JP-A-11-133668, JP-A-10-239903, and JP-A-8-20636.

A toner having a superior fixing property may be obtained by using the specific polyester according to the exemplary embodiment as a binder resin for toner. In the toner according to the exemplary embodiment, other well-known binder resins including vinyl resins such as styrene-acrylic resin, epoxy resins, polycarbonates, and polyurethanes may be used in combination within a range where the effects of the exemplary embodiment are not impaired. The content of the specific polyester according to the exemplary embodiment in the binder resin is preferably 70% by weight or more, more preferably 90% by weight or more, and still more preferably substantially 100% by weight.

Electrostatic Charge Image Developing Toner

An electrostatic charge image developing toner (hereinafter, also referred to as "toner") according to the exemplary embodiment includes the specific polyester according to the exemplary embodiment and optionally may further include a polyester other than the specific polyester (hereinafter, referred to as "second polyester"), another binder resin, a colorant, a release agent, a charge-controlling agent, an external additive, and the like.

The second polyester used in the exemplary embodiment is an amorphous or crystalline polyester, and examples thereof include a polycondensate of a well-known polycarboxylic acid and a well-known polyol.

As the second polyester, a crystalline polyester resin is preferable, and a polycondensate of an aliphatic dicarboxylic acid (including anhydrides and chlorides thereof) and an aliphatic diol is particularly preferable from the viewpoint of a low-temperature fixing property.

Examples of the aliphatic diol include ethylene glycol, diethylene glycol, triethylene glycol, 1,2-propylene glycol, 1,3-propylene glycol, 1,4-butanediol, 1,4-butenediol, neopentyl glycol, 1,5-pentane glycol, 1,6-hexanediol, 1,4-cyclohexanediol, 1,4-cyclohexanedimethanol, dipropylene glycol, polyethylene glycol, polypropylene glycol, polytetramethylene glycol, bisphenol A, bisphenol Z, and hydrogenated bisphenol A.

Examples of the aliphatic dicarboxylic acid include oxalic acid, malonic acid, succinic acid, glutaric acid, adipic acid, pimelic acid, suberic acid, azelaic acid, sebacic acid, maleic acid, fumaric acid, citraconic acid, itaconic acid, glutaconic acid, n-dodecyl succinic acid, n-dodecenyl succinic acid, isododecyl succinic acid, isododecenyl succinic acid, n-octyl succinic acid, n-octenyl succinic acid, and anhydrides and chlorides of the above-described acids.

Examples of the crystalline second polyester include a polyester which is a polycondensate of 1,4-cyclohexanedimethanol and adipic acid, a polyester which is a polycondensate of 1,6-hexanediol and sebacic acid, a polyester which is a polycondensate of ethylene glycol and succinic acid, a polyester which is a polycondensate of ethylene glycol and sebacic acid, and a polyester which is a polycondensate of 1,4-butanediol and succinic acid. Among these, a polyester which is a polycondensate of 1,4-cyclohexanedimethanol and adipic acid is preferably used.

In addition, examples of the crystalline second polyester include a polyester which is a polycondensate of 1,10-decanediol and sebacic acid and a polyester which is a polycondensate of 1,9-nonanediol and dodecanedioic acid. Among these, a polyester obtained by a reaction of 1,9-nonanediol and dodecanedioic acid is most preferably used.

The weight average molecular weight of the second polyester is preferably from 5,000 to 50,000 and more preferably from 10,000 to 20,000.

When the second polyester is crystalline, the melting temperature thereof is, for example, from 50° C. to 100° C. and preferably from 60° C. to 80° C.

The melting temperature is a value which is obtained as a peak temperature of an endothermic peak obtained by differential scanning calorimetry (DSC). In addition, a crystalline polyester resin may show plural melting peaks, but in the exemplary embodiment, a temperature having a maximum peak is considered to be the melting temperature.

The content of the second polyester is preferably from 1 part by weight to 20 parts by weight and more preferably from 5 parts by weight to 15 parts by weight with respect to 100 parts by weight of all the binder resins.

Regarding the content of the second polyester, a weight ratio (Second Polyester/First Polyester) of the second polyester to the first polyester (specific polyester) is preferably from 0.01 to 0.25 and more preferably from 0.05 to 0.18.

Colorant

Examples of the colorant include pigments such as carbon black, chrome yellow, Hansa Yellow, Benzidine Yellow, Threne Yellow, Quinoline Yellow, Pigment Yellow, Permanent Orange GTR, Pyrazolone Orange, Vulcan Orange, Watchung Red, Permanent Red, Brilliant Carmine 3B, Brilliant Carmine 6B, Du Pont Oil Red, Pyrazolone Red, Lithol Red, Rhodamine B Lake, Lake Red C, Pigment Red, Rose Bengal, Aniline Blue, Ultramarine Blue, Calco Oil Blue, Methylene Blue Chloride, Phthalocyanine Blue, Pigment Blue, Phthalocyanine Green, and Malachite Green Oxalate; and dyes such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes. Among these colorants, one kind may be used alone, or two or more kinds may be used in combination.

Optionally, the colorant may be surface-treated, or may be used in combination with a dispersant.

The content of the colorant is, for example, preferably from 1% by weight to 30% by weight and more preferably from 3% by weight to 15% by weight with respect to toner particles.

Release Agent

Examples of the release agent include hydrocarbon waxes; natural waxes such as carnauba wax, rice wax, and candelilla wax; synthetic or mineral and petroleum waxes such as montan wax; and ester waxes such as fatty acid ester and montanic acid ester. The release agent is not limited to these examples.

The melting temperature of the release agent is preferably from 50° C. to 110° C. and more preferably from 60° C. to 100° C.

The melting temperature of the release agent is calculated from the DSC curve obtained from differential scanning calorimetry (DSC) according to a "melting peak temperature" described in a method of calculating melting temperature in "Testing methods for transition temperatures of plastics" of JIS K7121-1987.

The content of the release agent is, for example, preferably from 1% by weight to 20% by weight and more preferably from 5% by weight to 15% by weight with respect to toner particles.

Other Additives

Examples of other additives include well-known additives such as a magnetic material, a charge-controlling agent, and inorganic powder. These additives are contained in the toner particles as internal additives.

Properties of Toner Particles

The toner particles may have a single-layer structure or a so-called core-shell structure including: a core (core particles) and a coating layer (shell layer) that coats the core.

The volume average particle diameter (D50v) of the toner particles is preferably from 2 μm to 10 μm and more preferably from 4 μm to 8 μm.

Various average particle diameters and various particle diameter distribution indices of the toner particles are measured by using COULTER MULTISIZER II (manufactured by Beckman Coulter Co., Ltd.) as a measuring device and using ISOTON-II (manufactured by Beckman Coulter Co., Ltd.) as an electrolytic solution.

During this measurement, from 0.5 mg to 50 mg of a measurement sample is added to 2 ml of an aqueous solution containing 5% by weight of a surfactant (preferably, sodium alkylbenzene sulfonate) which is a dispersant. This solution is added to from 100 ml to 150 ml of the electrolytic solution.

The electrolytic solution in which the measurement sample is suspended is dispersed with an ultrasonic disperser for 1 minute. Then, a particle diameter distribution of particles having a particle diameter in a range of 2 μm to 60 μm is measured using COULTER MULTISIZER II and an aperture having an aperture size of 100 μm. The number of particles to be sampled is 50,000.

Using the measured particle distribution, volume and number cumulative particle diameter distributions are drawn on divided particle diameter ranges (channels) in order from the smallest particle diameter. In addition, particle diameters having cumulative values of 16% by volume and number are defined as a volume particle diameter D16v and a number particle diameter D16p, respectively. Particle diameters having cumulative values of 50% by volume and number are defined as a volume average particle diameter D50v and a number average particle diameter D50p, respectively. Particle diameters having cumulative values of 84% by volume and number are defined as a volume particle diameter D84v and a number particle diameter D84p, respectively.

Using these values, a volume average particle diameter distribution index (GSDv) is calculated from $(D84v/D16v)^{1/2}$, and a number average particle diameter distribution index (GSDp) is calculated from $(D84p/D16p)^{1/2}$.

The shape factor SF1 of the toner particles is preferably from 110 to 150 and more preferably from 120 to 140.

The shape factor SF1 is obtained from the following expression.

$$SF1=(ML^{2}/A)\times(\pi/4)\times100 \quad \text{Expression:}$$

In the expression, ML represents an absolute maximum length of a toner particle, and A represents a projected area of a toner particle.

Specifically, the shape factor SF1 is converted into a numerical value mainly by analyzing a microscopic image or a scanning electron microscope image using an image analyzer, and is calculated as follows. That is, an optical microscope image of particles sprayed on a glass slide surface is input to an image analyzer LUZEX (manufactured by Nireco Corporation) through a video camera, maximum lengths and projected areas of 100 particles are obtained to calculate shape factors thereof from the above expression, and an average value thereof is obtained.

External Additive

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)n$, $Al_2O_3 \cdot 2SiO_2$, $CaCO_3$, $MgCO_3$, $BaSO_4$, and $MgSO_4$.

Surfaces of the inorganic particles as the external additive may be treated with a hydrophobizing agent. The treatment with a hydrophobizing agent may be performed, for example, by dipping the inorganic particles in the hydrophobizing agent. The hydrophobizing agent is not particularly limited, and examples thereof include a silane coupling agent, silicone oil, a titanate coupling agent, and an aluminum coupling agent. Among these, one kind may be used alone, or two or more kinds may be used in combination.

The amount of the hydrophobizing agent is, for example, from 1 part by weight to 10 parts by weight with respect to 100 parts by weight of the inorganic particles.

Examples of the external additive include resin particles (for example, resin particles of polystyrene, PMMA, and melamine resin) and a cleaning aid (for example, particles of metal salts of higher fatty acids represented by zinc stearate and fluorine polymers).

The amount of the external additive externally added is, for example, preferably from 0.01% by weight to 5% by weight and more preferably from 0.01% by weight to 2% by weight with respect to the total weight of the toner particles.

Preparing Method of Toner

In order to prepare the toner according to the exemplary embodiment, after toner particles are prepared, the toner particles may be used as the toner, or an external additive may be externally added to the toner particles and thereby obtaining the toner.

The toner particles may be prepared using either a dry method (for example, a kneading and pulverizing method) or a wet method (for example, an aggregation and coalescence method, a suspension and polymerization method, or a dissolution and suspension method). The preparing method of the toner particles is not limited to these methods, and a well-known method is adopted.

Kneading and Pulverizing Method

In the kneading and pulverizing method, toner material including a binder resin is kneaded to obtain a kneaded material, and the kneaded material is pulverized to prepare toner particles. Optionally, the particles obtained by pulverizing the kneaded material are classified using, for example, a centrifugal classifier or an inertial classifier to remove fine particles (particles having a diameter less than a target range) and coarse particles (particles having a diameter more than a target range), thereby obtaining toner particles.

Aggregation and Coalescence Method

When toner particles are prepared using the aggregation and coalescence method, the toner particles are prepared through the following processes including: a process (resin particle dispersion preparing process) of preparing a resin particle dispersion in which resin particles which form a binder resin are dispersed; a process (aggregated particle forming process) of forming aggregated particles by aggregating the resin particles (optionally, including other particles) in the resin particle dispersion (optionally in a dispersion in which the resin particle dispersion is mixed with another particle dispersion); and a process (coalescing process) of forming toner particles by heating an aggregated particle dispersion in which the aggregated particles are dispersed to coalesce the aggregated particles.

Hereinafter, each process of the aggregation and coalescence method will be described in detail. In the following process, a method of obtaining toner particles including a colorant and a release agent will be described, but the colorant and the release agent are optionally used. Additives other than the colorant and the release agent may be used.

Resin Particle Dispersion Preparing Process

First, a resin particle dispersion in which resin particles which form a binder resin are dispersed and other dispersions, for example, a colorant dispersion in which colorant particles are dispersed and a release agent dispersion in which release agent particles are dispersed are prepared.

The resin particle dispersion is prepared, for example, by dispersing resin particles in a dispersion medium using a surfactant.

Examples of the dispersion medium used in the resin particle dispersion include an aqueous medium.

Examples of the aqueous medium include water such as distilled water and ion exchange water; and alcohols. Among these, one kind may be used alone, or two or more kinds may be used in combination.

Examples of the surfactant include anionic surfactants such as sulfuric acid ester salts, sulfonic acid salts, phosphoric acid esters, and soaps; cationic surfactants such as amine salts and quaternary ammonium salts; and nonionic surfactants such as polyethylene glycol, alkylphenol ethylene oxide adducts, and polyols. Among these, an anionic surfactant or a cationic surfactant is preferably used. A nonionic surfactant may be used in combination with an anionic surfactant or a cationic surfactant.

As the surfactant, one kind may be used alone, or two or more kinds may be used in combination.

Examples of a method of dispersing resin particles in a dispersion medium include general methods using a rotary shearing homogenizer or a dispersing machine having a medium such as a ball mill, a sand mill or a DYNO mill. Depending on the kind of resin particles, for example, resin particles may be dispersed in a dispersion medium using a phase-transfer emulsion method. In the phase-transfer emulsion method, a resin to be dispersed is dissolved in a hydrophobic organic solvent in which the resin is soluble, a base is added to an organic continuous phase (O phase) to neutralize the organic continuous phase, and then water (W phase) is poured thereinto. As a result, the phase is transferred from W/O to O/W, and the resin is dispersed in an aqueous medium in a particle form.

The volume average particle diameter of the resin particles dispersed in the resin particle dispersion is, for example, preferably from 0.01 µm to 1 µm, more preferably from 0.08 µm to 0.8 µm, and still more preferably from 0.1 µm to 0.6 µm.

In order to obtain the volume average particle diameter of the resin particles, using a particle diameter distribution which is obtained from measurement of a laser diffraction particle diameter distribution analyzer (for example, LA-700 manufactured by Horiba Ltd.), a volume cumulative distribution is drawn on divided particle size ranges (channels) in order from the smallest particle size. A particle diameter having a cumulative volume of 50% with respect to all the particles is defined as the volume average particle diameter D50v. The volume average particle diameter of other particles in other dispersions are measured using the same method as above.

The content of the resin particles in the resin particle dispersion is preferably from 5% by weight to 50% by weight and more preferably from 10% by weight to 40% by weight.

Using the same preparation method as that of the resin particle dispersion, for example, a colorant dispersion and a release agent dispersion are prepared. That is, regarding the dispersion medium, the dispersing method, the volume average particle diameter of the particles, and the content of the particles in the resin particle dispersion, the same shall be applied to the colorant dispersion and the release agent dispersion.

Aggregated Particle Forming Process

Next, the resin particle dispersion, the colorant dispersion, and the release agent dispersion are mixed.

Then, the resin particles, the colorant particles, and the release agent particles are hetero-aggregated in the mixed dispersion to form aggregated particles having a diameter close to a target particle diameter of toner particles which include the resin particles, the colorant particles, and the release agent particles.

Specifically, for example, a coagulant is added to the mixed dispersion, the pH of the mixed dispersion is adjusted to be acidic (for example, to be within a pH range from 2 to 5), and optionally a dispersion stabilizer is added. Next, the mixed dispersion is heated to a temperature close to the glass transition temperature of the resin particle (specifically, a temperature ranging from a temperature which is lower than the glass transition temperature of the resin particle by 30° C. to a temperature which is lower than the glass transition temperature of the resin particle by 10° C.) to aggregate the particles dispersed in the mixed dispersion. As a result, aggregated particles are formed.

In the aggregated particle forming process, for example, the mixed dispersion may be heated after adding a coagulant at room temperature (for example, 25° C.) while stirring the mixed dispersion using a rotary shearing homogenizer, adjusting the pH of the mixed dispersion to be acidic (for example, to be within a pH range from 2 to 5), and optionally adding a dispersion stabilizer.

As the coagulant, a surfactant having a polarity opposite to that of a surfactant included in the mixed dispersion is used, and examples thereof include an inorganic metal salt and a di- or higher valent metal complex. When a metal complex is used as the coagulant, the amount of the coagulant used is reduced, and a charging property is improved.

The coagulant may be used in combination with an additive for forming a complex or a similar bond with metal ions of the coagulant. As this additive, a chelating agent is preferably used.

Examples of the inorganic metal salt include metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

As the chelating agent, a water-soluble chelating agent may be used. Examples of the chelating agent include oxycarboxylic acids such as tartaric acid, citric acid, and gluconic acid; and aminocarboxylic acids such as iminodiacetic acid (IDA), nitrilotriacetic acid (NTA), and ethylenediaminetetraacetic acid (EDTA).

The amount of the chelating agent added is, for example, preferably from 0.01 part by weight to 5.0 parts by weight and more preferably 0.1 part by weight or more and less than 3.0 parts by weight with respect to 100 parts by weight of the resin particles.

Coalescing Process

Next, the aggregated particle dispersion in which the aggregated particles are dispersed is heated to the glass transition temperature of the resin particle or higher (specifically, a temperature which is higher than the glass transition temperature of the resin particle by 10° C. to 30° C.) to coalesce the aggregated particle. As a result, toner particles are formed.

Through the above-described processes, the toner particles are obtained.

Toner particles may be prepared through the following processes including: a process of forming second aggregated particles by obtaining an aggregated particle dispersion in which aggregated particles are dispersed, and then further mixing the aggregated particle dispersion with a resin particle dispersion in which resin particles are dispersed so as to further attach the resin particles to surfaces of the aggregated particles; and a process of forming toner particles having a core-shell structure by heating a second aggregated particle dispersion in which the second aggregated particles are dispersed to coalesce the second aggregated particles.

After the coalescing process ends, toner particles formed in the solution are subjected to well-known processes including a washing process, a solid-liquid separation process, and a drying process. As a result, dry toner particles are obtained.

In the washing process, it is preferable that displacement washing using ion exchange water is sufficiently performed from the viewpoint of the charging property. In addition, in the solid-liquid separation process, although there is no particular limitation, it is preferable that suction filtration, pressure filtration, or the like is performed from the viewpoint of productivity. In addition, in the drying process, although there is no particular limitation, it is preferable that freeze drying, flash jet drying, fluidized drying, vibration-type fluidized drying, or the like is performed from the viewpoint of productivity.

The toner according to the exemplary embodiment is prepared, for example, by adding the external additive to the dry toner particles and mixing them with each other. It is preferable that the mixing is performed using a V blender, a HENSCHEL mixer, or a LODIGE mixer. Further, optionally, coarse particles of the toner may be removed, for example, using a vibration classifier or a wind classifier.

Electrostatic Charge Image Developer

An electrostatic charge image developer according to the exemplary embodiment includes at least the toner according to the exemplary embodiment. The electrostatic charge image developer according to the exemplary embodiment may be a single-component developer including only the toner according to the exemplary embodiment or a two-component developer in which the toner and a carrier are mixed.

The carrier is not particularly limited, and for example, a well-known carrier may be used. Examples of the carrier include a resin-coated carrier in which a surface of core formed of magnetic particle is coated with a resin; a magnetic particle-dispersed carrier in which magnetic particles are dispersed and blended in a matrix resin; and a resin-impregnated carrier in which porous magnetic particles are impregnated with a resin. In the magnetic particle-dispersed carrier or the resin-impregnated carrier, particle constituting the carrier may be used as a core, and surfaces of the core may be coated with a resin.

Examples of the magnetic particles include particles of magnetic metals such as iron, nickel, and cobalt; and particles of magnetic oxides such as ferrite and magnetite.

Examples of conductive particles include particles of metals such as gold, silver, and copper; and particles of carbon black, titanium oxide, zinc oxide, tin oxide, barium sulfate, aluminum borate, potassium titanate, and the like.

Examples of the coating resin and the matrix resin include polyethylene, polypropylene, polystyrene, polyvinylacetate, polyvinylalcohol, polyvinylbutyral, polyvinyl chloride, polyvinyl ether, polyvinyl ketone, vinyl chloride-vinyl acetate copolymers, styrene-acrylic acid copolymers, straight silicone resins having an organosiloxane bond or modified products thereof, fluororesins, polyester, polycarbonate, phenol resins, and epoxy resins. Additives such as a conductive material may be added to the coating resin and the matrix resin.

In order to coat the surfaces of the cores with the resin, for example, a method is used in which the surfaces of the cores are coated with a coating layer-forming solution obtained by dissolving the coating resin and various additives (which are optionally used) in an appropriate solvent. The solvent is not particularly limited and may be selected in consideration of the kind of the coating resin to be used, coating suitability, and the like. Examples of a specific resin coating method include a dipping method in which the cores are dipped in a coating layer-forming solution; a spray method in which a coating layer-forming solution is sprayed on the surfaces of the cores; a fluidized bed method in which a coating layer-forming solution is sprayed on the core while floating the cores with flowing air; and a kneader coater method in which the cores of the carrier and a coating layer-forming solution are mixed in a kneader coater, and then a solvent is removed.

A mixing ratio (weight ratio; toner:carrier) of the toner to the carrier in the two-component developer is preferably 1:100 to 30:100 and more preferably 3:100 to 20:100.

Image Forming Apparatus and Image Forming Method

An image forming apparatus and an image forming method according to the exemplary embodiment will be described.

The image forming apparatus according to the exemplary embodiment includes: an image holding member; a charging unit that charges a surface of the image holding member; an electrostatic charge image forming unit that forms an electrostatic charge image on the charged surface of the image holding member; a developing unit that accommodates an electrostatic charge image developer and develops the electrostatic charge image, which is formed on the surface of the image holding member, using the electrostatic charge image developer to form a toner image; a transfer unit that transfers the toner image, which is formed on the surface of the image holding member, to a surface of a recording medium; and a fixing unit that fixes the toner image transferred onto the surface of the recording medium. As the electrostatic charge image developer, the electrostatic charge image developer according to the exemplary embodiment is used.

In the image forming apparatus according to the exemplary embodiment, an image forming method (image forming method according to the exemplary embodiment) is performed, the method including: a charging process of charging a surface of an image holding member; an electrostatic charge image forming process of forming an electrostatic charge image on the charged surface of the image holding member; a developing process of developing the electrostatic charge image, which is formed on the surface of the image holding member, using the electrostatic charge image developer according to the exemplary embodiment to form a toner image; a transfer process of transferring the toner image, which is formed on the surface of the image holding member, to a surface of a recording medium; and a fixing process of fixing the toner image transferred onto the surface of the recording medium.

As the image forming apparatus according to the exemplary embodiment, various well-known image forming apparatuses may be used, the apparatuses including: a direct transfer type apparatus in which a toner image formed on a surface of an image holding member is directly transferred to a recording medium; an intermediate transfer type apparatus in which a toner image formed on a surface of an image holding member is primarily transferred to a surface of an intermediate transfer member, and the toner image transferred to the surface of the intermediate transfer member is secondarily transferred to a surface of a recording medium; an apparatus including a cleaning unit that cleans a surface of an image holding member after a toner image is transferred and before charging; and an apparatus including an erasing unit that irradiates a surface of an image holding member with erasing light to perform erasing after a toner image is transferred and before charging.

When the image forming apparatus according to the exemplary embodiment is the intermediate transfer type apparatus, for example, a transfer unit includes: an intermediate transfer member having a surface to which a toner image is transferred; a primary transfer unit that primarily transfers a toner image, which is formed on a surface of an image holding member, to the surface of the intermediate transfer member; and a secondary transfer unit that secondarily transfers the toner image, which is transferred to the surface of the intermediate transfer member, to a surface of a recording medium.

In the image forming apparatus according to the exemplary embodiment, for example, a portion including the developing unit may have a cartridge structure (process cartridge) which is detachable from the image forming apparatus. As the process cartridge, for example, a process cartridge that accommodates the electrostatic charge image developer according to the exemplary embodiment and includes the developing unit is preferably used.

Hereinafter, an example of the image forming apparatus according to the exemplary embodiment will be described, but the image forming apparatus is not limited thereto. In the following description, major components illustrated in the drawings will be described, and the other components will not be described.

FIG. 1 is a configuration diagram schematically illustrating the image forming apparatus according to the exemplary embodiment.

The image forming apparatus illustrated in FIG. 1, includes first to fourth electrophotographic image forming units 10Y, 10M, 10C, and 10K (image forming units) that output images of the respective colors including yellow (Y), magenta (M), cyan (C), and black (K) based on color-separated image data. These image forming units (hereinafter, also simply referred to as "units") 10Y, 10M, 10C, and 10K are horizontally arranged in parallel at predetermined intervals. These units 10Y, 10M, 10C, and 10K may be process cartridges which are detachable from the image forming apparatus.

An intermediate transfer belt 20 (an example of the intermediate transfer member) extends through a region above the respective units 10Y, 10M, 10C, and 10K. The intermediate transfer belt 20 is wound around a drive roller 22 and a support roller 24 which contact the inner surface of the intermediate transfer belt 20. The intermediate transfer belt 20 travels in a direction moving from the first unit 10Y to the fourth unit 10K. A force is applied to the support roller 24 by a spring (not illustrated) in a direction away from the drive roller 22, and a tension is applied to the intermediate transfer belt 20 wound around the drive roller 22 and the support roller 24. In addition, an intermediate transfer member cleaning device 30 is provided on the side of an image holding surface of the intermediate transfer belt 20 to be opposite to the drive roller 22.

In addition, the respective toners of yellow, magenta, cyan, and black which are accommodated in toner cartridges 8Y, 8M, 8C, and 8K are supplied to developing devices (examples of the developing unit) 4Y, 4M, 4C, and 4K of the respective units 10Y, 10M, 10C, and 10K, respectively.

Since the first to fourth units 10Y, 10M, 10C, and 10K have the same configuration, operation, and action, the first unit 10Y which is arranged on an upstream side in the traveling direction of the intermediate transfer belt and forms a yellow image will be described as a representative example.

The first unit 10Y includes a photoreceptor 1Y which functions as the image holding member. Around the photoreceptor 1Y, a charging roller 2Y (an example of the charging unit) that charges a surface of the photoreceptor 1Y to a predetermined potential; an exposure device 3 (an example of the electrostatic charge image forming unit) that exposes the charged surface to a laser beam 3Y based on a color-separated image signal to form an electrostatic charge image thereon; a developing device 4Y (an example of the developing unit) that supplies charged toner to the electrostatic charge image to develop the electrostatic charge image; a primary transfer roller 5Y (an example of the primary transfer unit) that transfers the developed toner image to the intermediate transfer belt 20; and a photoreceptor cleaning device 6Y (an example of the cleaning unit) that removes the toner remaining on the surface of the photoreceptor 1Y after the primary transfer, are arranged in this order.

The primary transfer roller 5Y is arranged inside the intermediate transfer belt 20 and is provided at a position opposite to the photoreceptor 1Y. Further, bias power supplies (not illustrated) are connected to the primary transfer rollers 5Y, 5M, 5C, and 5K of the respective units to apply primary transfer biases thereto. A controller (not illustrated) controls the respective bias power supplies to change the transfer bias values which are applied to the respective primary transfer rollers.

Hereinafter, the operation of forming the yellow image in the first unit 10Y will be described.

First, before the operation, the surface of the photoreceptor 1Y is charged to a potential of −600 V to −800 V by the charging roller 2Y.

The photoreceptor 1Y is formed by laminating a photosensitive layer on a conductive substrate (for example, volume resistivity at 20° C.: $1 \times 10^{-6}$ Ωcm or lower). This photosensitive layer typically has high resistance (resistance of a general resin) but has a property in which, when being irradiated with the laser beam, the specific resistance of the portion irradiated with the laser beam changes. Therefore, the charged surface of the photoreceptor 1Y is irradiated with the laser beam 3Y through the exposure device 3 according to image data for yellow sent from the controller (not illustrated). As a result, an electrostatic charge image having a yellow image pattern is formed on the surface of the photoreceptor 1Y.

The electrostatic charge image is an image which is formed on the surface of the photoreceptor 1Y by charging and is a so-called negative latent image which is formed when the specific resistance of a portion, which is irradiated with the laser beam 3Y, of the photosensitive layer is reduced and the charge flows on the surface of the photoreceptor 1Y, while the charge remains in a portion which is not irradiated with the laser beam 3Y.

The electrostatic charge image formed on the photoreceptor 1Y is rotated to a predetermined development position along with the traveling of the photoreceptor 1Y. At this development position, the electrostatic charge image on the photoreceptor 1Y is developed and visualized as a toner image by the developing device 4Y.

The developing device 4Y accommodates, for example, an electrostatic charge image developer containing at least a yellow toner and a carrier. The yellow toner is frictionally charged by being agitated in the developing device 4Y to have a charge having the same polarity (negative polarity) as that of a charge on the photoreceptor 1Y and is held on a developer roller (an example of the developer holding member). When the surface of the photoreceptor 1Y passes through the developing device 4Y, the yellow toner is electrostatically attached to a latent image portion on the surface of the photoreceptor 1Y from which has been erased, and the latent image is developed with the yellow toner. The photoreceptor 1Y on which a yellow toner image is formed continuously travels at a predetermined rate, and the toner image developed on the photoreceptor 1Y is transported to a predetermined primary transfer position.

When the yellow toner image on the photoreceptor 1Y is transported to the primary transfer position, a primary transfer bias is applied to the primary transfer roller 5Y, an electrostatic force is applied to the toner image in a direction moving from the photoreceptor 1Y to the primary transfer roller 5Y, and the toner image on the photoreceptor 1Y is transferred to the intermediate transfer belt 20. The transfer bias applied at this time has a positive polarity opposite to the negative polarity of the toner, and is controlled to +10 µA in the first unit 10Y by the controller (not shown).

On the other hand, the toner remaining on the photoreceptor 1Y is removed and collected by the photoreceptor cleaning device 6Y.

In addition, primary transfer biases which are applied to the primary transfer rollers 5M, 5C and 5K of the second unit 10M and subsequent units, respectively, are controlled in a similarly way to that of the primary transfer bias of the first unit.

In this way, the intermediate transfer belt 20 to which the yellow toner image is transferred by the first unit 10Y is sequentially transported through the second to fourth units 10M, 10C and 10K, and toner images of the respective colors are superimposed and multilayer transferred.

The intermediate transfer belt 20 to which the four color toner images are multilayer transferred by the first to fourth units reaches a secondary transfer portion which is configured with the intermediate transfer belt 20, the support roller 24, and a secondary transfer roller 26 (an example of the secondary transfer unit), in which the support roller 24 contacts the inner surface of the intermediate transfer belt, and the secondary transfer roller 26 is arranged on an image holding surface side of the intermediate transfer belt 20. Meanwhile, a recording sheet P (an example of the recording medium) is supplied to a gap at which the secondary transfer roller 26 and the intermediate transfer belt 20 are in contact with each other at a predetermined timing through a supply mechanism, and a predetermined secondary transfer bias is applied to the support roller 24. The transfer bias applied at this time has the negative polarity which is the same as the polarity of the toner, and an electrostatic force is applied to the toner image in a direction moving from the intermediate transfer belt 20 to the recording sheet P. As a result, the toner image on the intermediate transfer belt 20 is transferred to the recording sheet P. At this time, the secondary transfer bias is determined depending on a resistance detected by a resistance detecting unit (not illustrated) which detects a resistance of the secondary transfer portion, and the voltage is controlled.

Thereafter, the recording sheet P is sent to a nip portion of a pair of fixing rollers in a fixing device 28 (an example of the fixing unit), and the toner image is fixed onto the recording sheet P to form a fixed image.

Examples of the recording sheet P to which the toner image is transferred include plain paper used for electrophotographic copying machines, printers and the like. As the recording medium, in addition to the recording sheet P, OHP sheets may be used.

In order to improve the smoothness of the image surface after the fixing, the surface of the recording sheet P is preferably smooth, and for example, coated paper obtained by coating the surface of plain paper with a resin or the like, or art paper for printing is suitably used.

The recording sheet P onto which a color image is completely fixed is discharged to an exit port, and a series of the color image formation operations ends.

Process Cartridge and Toner Cartridge

A process cartridge according to the exemplary embodiment will be described.

The process cartridge according to the exemplary embodiment includes a developing unit that accommodates the electrostatic charge image developer according to the exemplary embodiment and develops an electrostatic charge image, which is formed on a surface of an image holding member, using the electrostatic charge image developer to form a toner image, and is detachable from an image forming apparatus.

In addition, the process cartridge according to the exemplary embodiment is not limited to the above-described configuration, and may include the developing device and optionally at least one component selected from other units such as an image holding member, a charging unit, an electrostatic charge image forming unit, and a transfer unit.

Hereinafter, an example of the process cartridge according to the exemplary embodiment will be described, but the process cartridge is not limited thereto. In the following description, major components illustrated in the drawings will be described, and the other components will not be described.

Figure 2:
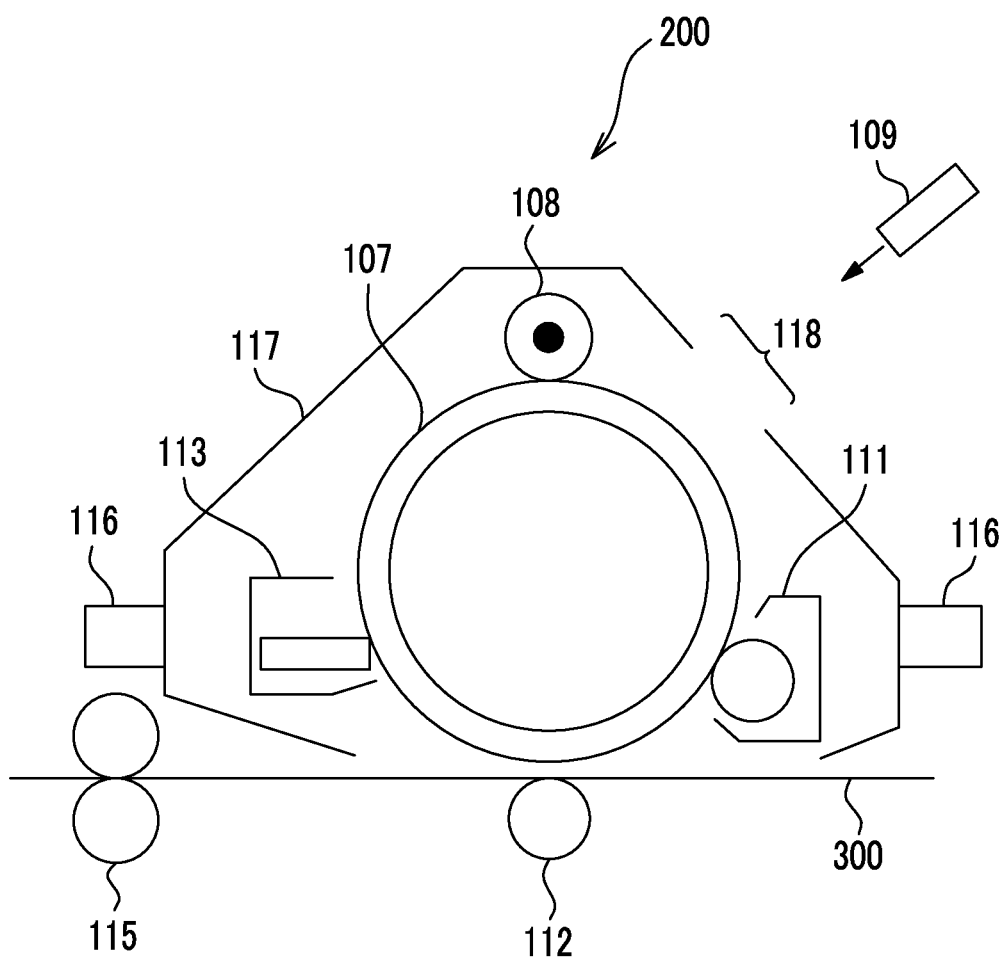
FIG. 2 is a configuration diagram schematically illustrating an example of a process cartridge according to an exemplary embodiment of the invention.

FIG. 2 is a configuration diagram schematically illustrating the process cartridge according to the exemplary embodiment.

A process cartridge 200 illustrated in FIG. 2 is, for example, a cartridge in which a photoreceptor 107 (an example of the image holding member), and a charging roller 108 (an example of the charging unit), a developing device 111 (an example of the developing unit), and a photoreceptor cleaning device 113 (an example of the cleaning unit) provided around the photoreceptor 107 are integrally combined in a housing 117 including a mounting rail 116 and an opening 118 for exposure.

In FIG. 2, reference numeral 109 represents an exposure device (an example of the electrostatic charge image forming unit), reference numeral 112 represents a transfer device (an example of the transfer unit), reference numeral 115 represents a fixing device (an example of the fixing unit), and reference numeral 300 represents a recording sheet (an example of the recording medium).

Next, a toner cartridge according to the exemplary embodiment will be described.

The toner cartridge according to the exemplary embodiment includes a container that accommodates the toner according to the exemplary embodiment and is detachable from an image forming apparatus. The toner cartridge accommodates a replenishment toner which is supplied to a developing unit provided in an image forming apparatus.

The image forming apparatus illustrated in FIG. 1 has a configuration in which the toner cartridges 8Y, 8M, 8C, and 8K are detachable therefrom, and the developing devices 4Y, 4M, 4C, and 4K are connected to the toner cartridges corresponding to the respective colors through toner supply pipes (not illustrated). In addition, when the amount of toner accommodated in a toner cartridge is insufficient, this toner cartridge is replaced with a new one.

EXAMPLES

Hereinafter, the exemplary embodiment will be described in more detail using Examples but is not limited to these Examples. In the following description, unless specified otherwise, "part(s)" represents "part(s) by weight".

Method of Measuring Physical Properties of Polyester

Weight Average Molecular Weight (Mw) and Number Average Molecular Weight (Mn)

As a GPC, a device "HLC-8120GPC, SC-8020 (manufactured by Tosoh Corporation)" is used. As a column, two columns of "TSKGEL, SUPER HM-H" (manufactured by Tosoh Corporation; 6.0 mm ID×15 cm) are used. As an eluent, tetrahydrofuran (THF) is used. The measurement is performed using an RI detector under the following measurement conditions: a sample concentration of 0.5% by weight; a flow rate of 0.6 ml/min; a sample injection amount of 10 μl; and a temperature of 40° C. A calibration curve is prepared from 10 samples, "Polystyrene Standard Sample TSK Standard": "A-500", "F-1", "F-10", "F-80", "F-380", "A-2500", "F-4", "F-40", "F-128", and "F-700" (manufactured by Tosoh Corporation).

Acid Value

The acid value is measured using neutralization titration method according to JIS K0070.

That is, an appropriate amount of sample is fractionated, and 100 ml of solvent (mixed solution of diethyl ether and ethanol) and several drops of indicator (phenolphthalein solution) are added thereto, followed by shaking and mixing in a water bath until the sample is completely dissolved. The solution is titrated with 0.1 mol/l of ethanolic potassium hydroxide solution. The measurement ends when the indicator maintains a light pink color for 30 seconds. The acid value is calculated from the expression "A=(B×f×5.611)/S. In the expression, A represents the acid value, B represents the amount (ml) of 0.1 mol/l of ethanolic potassium hydroxide solution, f represents the factor of 0.1 mol/l of ethanolic potassium hydroxide solution used for titration, and S represents the weight (g) of the sample.

Glass Transition Temperature

The glass transition temperature is measured using a thermal analyzer "DSC-20" (manufactured by SEICO Electronics Industrial Co., Ltd.) after 10 mg of sample is heated at a fixed temperature increase rate (10° C./min).

Softening Temperature

The softening temperature is measured using a flow tester CFT-500 (manufactured by Shimadzu Corporation) as a temperature which corresponds to a half of the height between a flow start point and a flow endpoint when a 1 cm³-sized sample is melted and caused to flow out under conditions of a die pore diameter of 0.5 mm, a pressing load of 0.98 MPa (10 Kg/cm$^2$), and a temperature increase rate of 1° C./min.

Amount of Residual Dicarboxylic Acid

The amount of a dicarboxylic acid remaining in the polyester resin is determined by high performance liquid chromatography (HPLC). The determination is performed using a column shim-pack CLC-ODS (manufactured by Shimadzu Corporation) at a detector wavelength of 210 nm.

Synthesis of Polyester

Synthesis Example 1

Synthesis of Specific Rosin Diol 97 parts of neopentyl glycol diglycidyl ether (DENACOL EX211 manufactured by Nagase ChemteX Corporation, epoxy equivalent: 145 g/eq) as a bifunctional epoxy compound, 215 parts of hydrogenated rosin (FORALAX manufactured by Pinova Inc., acid value: 3.10×10$^{-3}$ mol/g) as a rosin component, and 0.4 parts of tetraethylammonium bromide (manufactured by Tokyo Chemical Industry Co., Ltd.) as a reaction catalyst are put into a stainless steel reaction container equipped with a stirrer, a heating machine, a cooling tube, and a thermometer. The temperature is increased to 160° C., and a ring-opening reaction between a carboxyl group of the rosin and an epoxy group of the epoxy compound is carried out. The reaction is continued at the same temperature for 4 hours and is stopped when the acid value reaches 0.5 mg KOH/g. As a result, Compound (6) shown in Table 1 is obtained.

Synthesis of Specific Polyester

An acid component and an alcohol component which are shown in Table 2 and 0.6 parts of tetra-n-butyl titanate (manufactured by Tokyo Chemical Industry Co., Ltd.) as a reaction catalyst are put into a stainless steel reaction container equipped with a stirrer, a heating machine, a thermometer, a fractionator, and a nitrogen gas introducing pipe. A polycondensation reaction is carried out in a nitrogen atmosphere at 230° C. for 7 hours under stirring. The molecular weight and the acid value are verified, and Polyester (1) is obtained.

2 g of Polyester (1) is fractionated and is heated to be hydrolyzed in 10 ml of heavy dimethylsulfoxide and 2 ml of heavy methanol solution (7N) of sodium hydroxide at 150° C. for 3 hours. Next, heavy water is added to the solution, and it is confirmed by $^1$H-NMR that the resin is formed as designed. The measurement results of Polyester (1) including the molecular weight, the acid value, the glass transition temperature, the softening temperature, and the amount of residual dicarboxylic acid are shown in Table 2.

Synthesis Examples 2 to 13

Polyesters (2) to (13) are synthesized with the same method as that of Synthesis Example 1, except that an acid component and an alcohol component are used as shown in Table 2. The measurement results of Polyesters (2) to (13) including the molecular weight, the acid value, the glass transition temperature, the softening temperature, and the amount of residual dicarboxylic acid are shown in Table 2. As the specific rosin diol, any one of Compounds (1) to (7) shown in Table 1 is used.

TABLE 1

| | Specific rosin diol | SP value |
|---|---|---|
| (1) | | 9.19 |
| (2) | | 9.15 |
| (3) | | 9.13 |

TABLE 1-continued

| Specific rosin diol | SP value |
|---|---|
| (4) 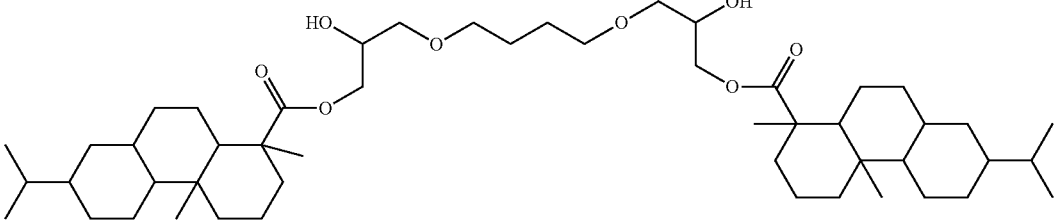 | 9.12 |
| (5) 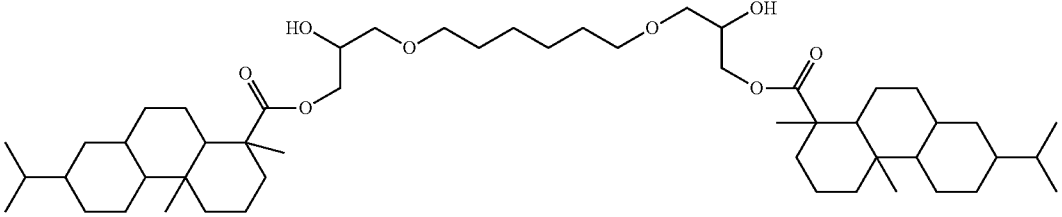 | 9.07 |
| (6) 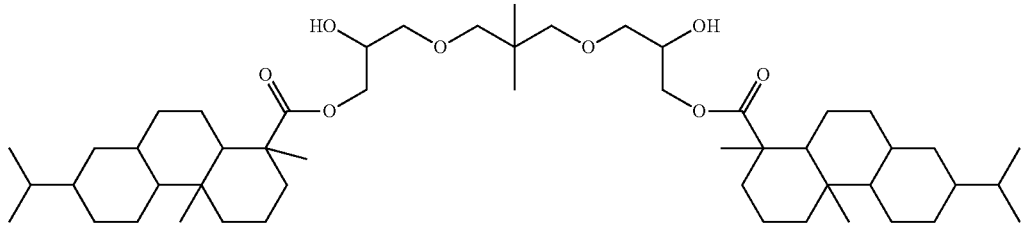 [SMILES: CC(C)C1CCC2C(CCC3C(C)(C(=O)OCC(O)COCC(C)(C)COCC(O)COC(=O)C4(C)CCCC5(C)C6CCC(C(C)C)CC6CCC45)CCCC23C)C1] | 9.04 |
| (7) 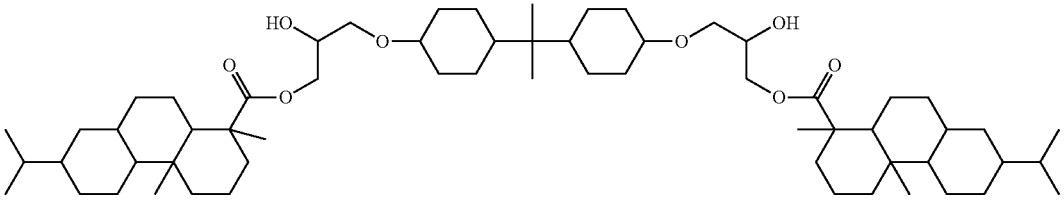 [SMILES: CC(C)C1CCC2C(CCC3C(C)(C(=O)OCC(O)COC4CCC(C(C)(C)C5CCC(OCC(O)COC(=O)C6(C)CCCC7(C)C8CCC(C(C)C)CC8CCC67)CC5)CC4)CCCC23C)C1] | 8.78 |

Comparative Synthesis Example 1

Polyester (C1) for comparison is synthesized with the same method as that of Synthesis Example 1, except that an acid component and an alcohol component are used as shown in Table 2. The measurement results of the polyester including the molecular weight, the acid value, the glass transition temperature, the softening temperature, and the amount of residual dicarboxylic acid are shown in Table 2. As the specific rosin diol, Compound (1) shown in Table 1 is used.

Comparative Synthesis Example 2

Synthesis of Rosin Diol 97 parts of neopentyl glycol diglycidyl ether (DENACOL EX211 manufactured by Nagase ChemteX Corporation, epoxy equivalent: 145 g/eq) as a bifunctional epoxy compound, 204 parts of disproportionated rosin (RONDIS FR manufactured by Arakawa Chemical Industries Ltd., acid value: $3.26 \times 10^{-3}$ mol/g) as a rosin component, and 0.4 parts of tetraethylammonium bromide (manufactured by Tokyo Chemical Industry Co., Ltd.) as a reaction catalyst are put into a stainless steel reaction container equipped with a stirrer, a heating machine, a cooling tube, and a thermometer. The temperature is increased to 160° C., and a ring-opening reaction between a carboxyl group of the rosin and an epoxy group of the epoxy compound is carried out. The reaction is continued at the same temperature for 4 hours and is stopped when the acid value reaches 0.5 mg KOH/g. As a result, a rosin diol represented by the following formula is obtained. The SP value is 10.1.

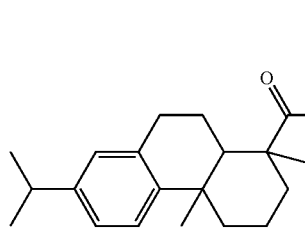

Synthesis of Polyester

Polyester (C2) for comparison is synthesized using the rosin diol, and an acid component and an alcohol component shown in Table 2. The measurement results of the polyester including the molecular weight, the acid value, the glass transition temperature, the softening temperature, and the amount of residual dicarboxylic acid are shown in Table 2.

Comparative Synthesis Example 3

Synthesis of Rosin Diol 124 parts of bisphenol A diglycidyl ether (JER828 manufactured by Mitsubishi Chemical Corporation, epoxy equivalent: 185 g/eq) as a bifunctional epoxy compound, 215 parts of hydrogenated rosin (FORALAX manufactured by Pinova Inc., acid value: $3.10 \times 10^{-3}$ mol/g) as a rosin component, and 0.4 parts of tetraethylammonium bromide (manufactured by Tokyo Chemical Industry Co., Ltd.) as a reaction catalyst are put into a stainless steel reaction container equipped with a stirrer, a heating machine, a cooling tube, and a thermometer. The temperature is increased to 160° C., and a ring-opening reaction between a carboxyl group of the rosin and an epoxy group of the epoxy compound is carried out. The reaction is continued at the same temperature for 4 hours and is stopped when the acid value reaches 0.5 mg KOH/g. As a result, a rosin diol represented by the following formula is obtained. The SP value is 9.52.

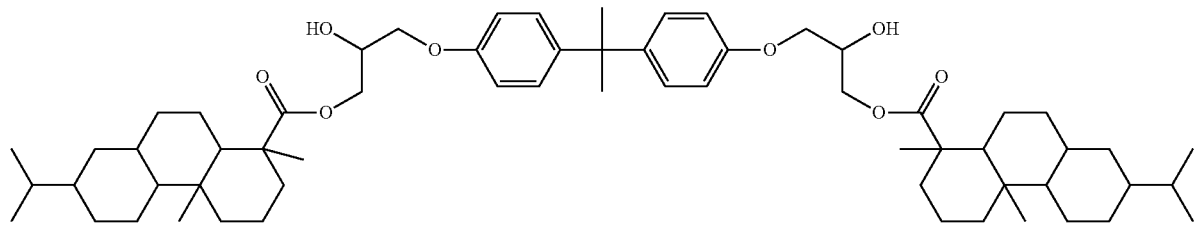 [SMILES: CC(C)C1CCC2C(CCC3C(C)(C(=O)OCC(O)COc4ccc(C(C)(C)c5ccc(OCC(O)COC(=O)C6(C)CCCC7(C)C8CCC(C(C)C)CC8CCC67)cc5)cc4)CCCC23C)C1]

Synthesis of Polyester

Polyester (C3) for comparison is synthesized using the rosin diol, and an acid component and an alcohol component shown in Table 2. The measurement results of the polyester including the molecular weight, the acid value, the glass transition temperature, the softening temperature, and the amount of residual dicarboxylic acid are shown in Table 2.

Comparative Synthesis Example 4

26 parts of propylene glycol (manufactured by Wako Pure Chemical Industries Ltd.) and 161 parts of glycerol (manufactured by Wako Pure Chemical Industries Ltd.) as alcohol components; 188 parts of hydrogenated rosin (FORALAX manufactured by Pinova Inc., acid value: $3.10 \times 10^{-3}$ mol/g), 319 parts of terephthalic acid (manufactured by Wako Pure Chemical Industries Ltd.), and 20 parts of succinic acid (manufactured by Wako Pure Chemical Industries Ltd.) as acid components; and 0.6 part of tetra-n-butyl titanate (manufactured by Tokyo Chemical Industry Co., Ltd.) as a reaction catalyst are put into a stainless steel reaction container equipped with a stirrer, a heating machine, a thermometer, a fractionator, and a nitrogen gas introducing pipe. A polycondensation reaction is carried out in a nitrogen atmosphere at 230° C. for 7 hours under stirring. The molecular weight and the acid value are verified, and Polyester (C4) for comparison is obtained. In the polyester, the weight average molecular weight (Mw) is 53,000, the number average molecular weight (Mn) is 3,400, the acid value is 17.1 mg KOH/g, the glass transition temperature is 55° C., the softening temperature is 114° C., and the amount of residual dicarboxylic acid is 3.2% by weight.

A repeating unit having a rosin ester group in a branch thereof which is included in Polyester (C4) is represented by the following left structure. The repeating unit is derived from at least a part of hydrogenated rosin and at least a part of glycerol. A chemical structure of a rosin diol corresponding to the repeating unit is represented by the following right structure, and the SP value of the rosin diol is 10.5.

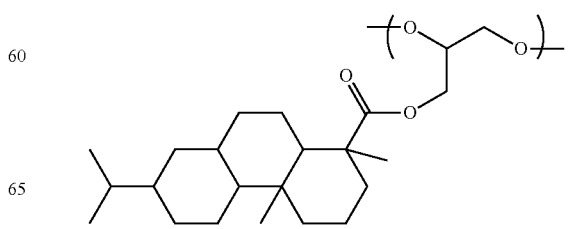

-continued

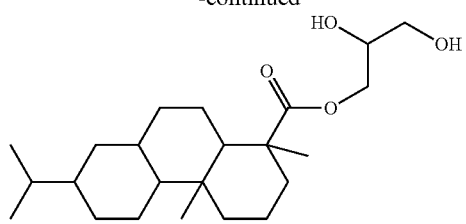

Comparative Synthesis Example 5

Polyester (C5) for comparison is synthesized with the same method as that of Synthesis Example 1, except that an acid component and an alcohol component are used as shown in Table 2. The measurement results of the polyester including the molecular weight, the acid value, the glass transition temperature, the softening temperature, and the amount of residual dicarboxylic acid are shown in Table 2. As the specific rosin diol, Compound (5) shown in Table 1 is used.

TABLE 2

| | | | Comparative Synthesis Example 1 | Comparative Synthesis Example 2 | Comparative Synthesis Example 3 | Comparative Synthesis Example 5 | Synthesis Example 1 | Synthesis Example 2 | Synthesis Example 3 | Synthesis Example 4 | Synthesis Example 5 |
|---|---|---|---|---|---|---|---|---|---|---|---|
| | Polyester | | (C1) | (C2) | (C3) | (C5) | (1) | (2) | (3) | (4) | (5) |
| Carboxylic Acid (Part(s) by Weight) | Aromatic | Terephthalic Acid | 347 | 319 | 319 | 297 | 319 | 319 | 319 | 319 | 161 |
| | | Isophthalic Acid | — | — | — | — | — | — | — | — | 161 |
| | Saturated Aliphatic | Succinic Acid | — | 20 | 20 | — | 20 | 20 | 20 | 20 | 18 |
| | | Adipic Acid | — | — | — | — | — | — | — | — | — |
| | Unsaturated Aliphatic | Fumaric Acid | — | — | — | 35 | — | — | — | — | — |
| Alcohol (Part(s) by Weight) | Specific Rosin Diol | | (1) 296 | — | — | (5) 315 | (6) 312 | (1) 296 | (3) 301 | (7) 356 | (2) 316 |
| | Another Rosin Diol | | — | 312 | 339 | — | — | — | — | — | — |
| | Propylene Glycol | | 133 | 133 | 133 | — | 133 | 133 | 133 | 133 | — |
| | Propane Diol | | — | — | — | — | — | — | — | — | 133 |
| | Neopentyl Glycol | | — | — | — | 182 | — | — | — | — | — |
| | Mw | | 56000 | 55000 | 55000 | 73000 | 56000 | 55000 | 57000 | 60000 | 56000 |
| | Mn | | 5200 | 5000 | 5100 | 3500 | 5000 | 5000 | 5100 | 5500 | 4900 |
| | Acid Value (mg KOH/g) | | 17.5 | 12.1 | 13.1 | 11.1 | 12.3 | 11.9 | 12.0 | 10.5 | 13.2 |
| | Glass Transition Temperature (° C.) | | 64.0 | 59.0 | 59.0 | 56.0 | 58.5 | 59.5 | 59.0 | 61.5 | 56.5 |
| | Softening Temperature (° C.) | | 127 | 120 | 121 | 126 | 119 | 120 | 119 | 122 | 117 |
| | Amount of Residual Dicarboxylic Acid (% by Weight) | | 2.5 | 1.2 | 1.4 | 1.6 | 1.1 | 1.0 | 1.2 | 1.3 | 1.0 |

| | | | Synthesis Example 6 | Synthesis Example 7 | Synthesis Example 8 | Synthesis Example 9 | Synthesis Example 10 | Synthesis Example 11 | Synthesis Example 12 | Synthesis Example 13 |
|---|---|---|---|---|---|---|---|---|---|---|
| | Polyester | | (6) | (7) | (8) | (9) | (10) | (11) | (12) | (13) |
| Carboxylic Acid (Part(s) by Weight) | Aromatic | Terephthalic Acid | 161 | 161 | 161 | 330 | 330 | 330 | 330 | 330 |
| | | Isophthalic Acid | 161 | 161 | 161 | — | — | — | — | — |
| | Saturated Aliphatic | Succinic Acid | 18 | 18 | 18 | — | — | — | — | — |
| | | Adipic Acid | — | — | — | 7 | 7 | 7 | 15 | 15 |
| | Unsaturated Aliphatic | Fumaric Acid | — | — | — | 6 | 6 | 6 | — | — |
| Alcohol (Part(s) by Weight) | Specific Rosin Diol | | (4) 306 | (6) 312 | (7) 356 | (5) 315 | (1) 296 | (4) 306 | (4) 306 | (4) 306 |
| | Another Rosin Diol | | — | — | — | — | — | — | — | — |
| | Propylene Glycol | | — | — | — | — | — | — | — | — |
| | Propane Diol | | 133 | 133 | 133 | — | — | — | — | — |
| | Neopentyl Glycol | | — | — | — | 182 | 182 | 182 | 182 | 182 |
| | Mw | | 57000 | 55000 | 65000 | 57000 | 56000 | 58000 | 58000 | 58000 |
| | Mn | | 5200 | 5000 | 6000 | 4100 | 4000 | 4200 | 5200 | 5200 |
| | Acid Value (mg KOH/g) | | 11.0 | 10.9 | 11.2 | 10.2 | 10.3 | 10.5 | 14.5 | 8.0 |
| | Glass Transition Temperature (° C.) | | 58.0 | 58.0 | 60.5 | 56.5 | 58.5 | 57.5 | 57.5 | 57.5 |
| | Softening Temperature (° C.) | | 118 | 118 | 121 | 124 | 123 | 125 | 118 | 118 |
| | Amount of Residual Dicarboxylic Acid (% by Weight) | | 1.2 | 1.1 | 1.2 | 1.1 | 1.2 | 1.0 | 1.5 | 0.6 |

Example 1

Preparation of Toner Particles

Polyester (1): 100 parts
Magenta pigment (C.I. Pigment Red 57): 3 parts
Paraffin wax (HNP-9 manufactured by Nippon Seiro Co. Ltd.): 10 parts The above-described materials are kneaded with an extruder and are pulverized with a surface pulverization-type pulverizer. Next, fine particles and coarse particles are removed by classification using a wind classifier (turbo classifier TC-15N manufactured by Nisshin Engineering Inc.) to obtain particles having an intermediate particle diameter. This process is repeated three times. As a result, magenta toner particles having a volume average particle diameter of 8 µm is obtained.

Preparation of Toner 100 parts of the toner particles and 0.5 part of silica (R812, manufactured by Nippon Aerosil Co., Ltd.) are mixed with each other using a high-speed mixer to obtain a toner.

Preparation of Developer 7 parts of the toner and 100 parts of a carrier (in which ferrite having a particle diameter of 50 µm is coated with a methyl methacrylate-styrene copolymer) are mixed with each other using a tumbler shaker mixer to obtain a developer.

Examples 2 to 4 and Comparative Examples 1 to 4

Toner particles, toners, and developers are obtained with the same method as that of Example 1, except that any one of Polyesters (2) to (4) and (C1) to (C4) is used instead of Polyester (1).

Example 5

Preparation of Amorphous Resin Particle Dispersion 200 parts of Polyester (5) is put into a high-temperature and high-pressure emulsifying device (CAVITRON CD1010 manufactured by Eurotec Ltd.) and is heated and melted at a temperature of 120° C. Separately, diluted ammonia water having a concentration of 0.37% by weight is prepared by diluting ammonia water with ion exchange water. This diluted ammonia water is supplied to the high-temperature and high-pressure emulsifying device at a rate of 0.1 L/min while heating it to 120° C. with a heat exchanger. The high-temperature and high-pressure emulsifying device is operated under conditions of a rotator rotating speed of 60 Hz and a pressure of 5 kg/cm². As a result, an amorphous resin particle dispersion (solid content: 30% by weight, volume average particle diameter: 160 nm) is obtained.

Preparation of Crystalline Resin Particle Dispersion 115 parts of dodecanedioic acid (manufactured by Tokyo Chemical Industry Co., Ltd.) and 101 parts of dodecanediol (manufactured by Ube Industries Ltd.) are put into a flask, and the temperature is increased to 160° C. for 1 hour. After it is confirmed that the inside of the reaction system is stirred, 0.02 part of dibutyltin oxide is further put into the flask. The temperature is increased to 200° C. for 6 hours while removing produced water by distillation. The dehydration condensation reaction is continued at 200° C. for 4 hours and then is stopped. After cooling the reaction solution, solid-liquid separation is performed, and a solid material is dried at 40° C. in a vacuum. As a result, a crystalline polyester resin is obtained.

Crystalline polyester resin: 50 parts
Anionic surfactant (NEOGEN SC, manufactured by Dai-ichi Kogyo Seiyaku Co. Ltd.): 2 Parts
Ion exchange water: 200 parts The above-described materials are mixed, are heated at 120° C., are dispersed with a homogenizer (ULTRA-TURRAX T50, manufactured by IKA), followed by dispersing with a pressure discharging homogenizer. As a result, when the volume average particle diameter reaches 180 nm, a crystalline resin particle dispersion having a solid content of 20% by weight is collected and obtained.

Preparation of Colorant Dispersion

Cyan pigment (C.I. Pigment Blue 15:3): 20 parts
Anionic surfactant (NEOGEN SC, manufactured by Dai-ichi Kogyo Seiyaku Co. Ltd.): 2 Parts
Ion exchange water: 80 parts The above-described materials are mixed and dispersed for 1 hour using a high pressure impact dispersing machine (ULTIMIZER HJP30006 manufactured by Sugino Machine Ltd.). As a result, a colorant dispersion (solid content: 20% by weight, volume average particle diameter: 180 nm) is obtained.

Preparation of Release Agent Dispersion

Fatty acid ester (WEP-5 manufactured by NOF Corporation): 50 parts
Anionic surfactant (NEOGEN RK, manufactured by Dai-ichi Kogyo Seiyaku Co. Ltd.): 5 parts
Ion exchange water: 200 parts The above-described materials are mixed, are heated, and are dispersed using a homogenizer (ULTRA-TURRAX T50 manufactured by IKA), followed by dispersing with a Manton-Gaulin high-pressure homogenizer (manufactured by Gaulin). As a result, a release agent dispersion (solid content: 20% by weight, volume average particle diameter: 180 nm) is obtained.

Preparation of Toner Particles

Amorphous resin particle dispersion: 150 parts
Crystalline resin particle dispersion: 50 parts
Colorant dispersion: 25 parts
Release agent dispersion: 40 parts
Polyaluminum chloride: 0.4 part
Ion exchange water: 100 parts The above-described materials are put into a round stainless steel flask and are dispersed with a homogenizer (ULTRA-TURRAX T50, manufactured by IKA), followed by heating in a heating oil bath to 48° C. under stirring. After the flask is kept at 48° C. for 60 minutes, 70 parts of the amorphous resin particle dispersion is added thereto. Next, the pH of the reaction system is adjusted to 8.0 using 0.5 mol/L of an aqueous sodium hydroxide solution, the stainless steel flask is sealed, and a stirring shaft is sealed with a magnetic force. The flask is heated to 90° C. under stirring and is kept at this temperature for 3 hours. Next, the content in the flask is cooled to room temperature at a temperature decrease rate of 2° C./min, is filtered, and is sufficiently washed with ion exchange water, followed by solid-liquid separation by Nutsche suction filtration. The solid material is redispersed in 3-liter of ion exchange water at 30° C., followed by stirring and washing at 300 rpm for 15 minutes. This washing operation is repeated 6 times. When the pH of the filtrate is 7.54, and the electrical conductance is 6.5 µS/cm, solid-liquid separation is performed by Nutsche suction filtration with No. 5A filter paper. Next, the solid material is dried in a vacuum for 12 hours. As a result, toner particles are obtained. The volume average particle diameter of the toner particles is 5.9 µm.

Preparation of Toner

Further, silica particles (average primary particle diameter: 40 nm) which are surface-treated with a hydrophobizing agent of hexamethyldisilazane, and metatitanic acid compound particles (average primary particle diameter: 20 nm) which are a reaction product of metatitanic acid and isobutyl trimethoxy silane, are added to the toner particles such that a coverage of the surfaces of the toner particles covered with each of the silica particles and the metatitanic acid compound particles is 40%. The mixture is mixed using a HENSCHEL mixer. As a result, a toner is prepared.

Preparation of Developer

The toner and a carrier (in which ferrite having a volume average particle diameter of 50 µm is coated with 1% by weight of polymethylmethacrylate) are mixed with each other such that a toner concentration is 5% by weight, followed by stirring and mixing with a ball mill for 5 minutes. As a result, a developer is prepared.

Examples 6 to 13 and Comparative Examples 5 to 7

Toner particles, toners, and developers are obtained with the same method as that of Example 5, except that any one of Polyesters (6) to (13) and (C3) to (C5) is used instead of Polyester (5).

Evaluation

Regarding Examples 1 to 13 and Comparative Examples 1 to 7, the toner is evaluated as follows. The results are shown in Table 3.

Low-Temperature Fixing Property

A modified machine of DOCUCENTRE COLOR 500 (manufactured by Fuji Xerox Co., Ltd.) from which a fixing device is removed is filled with a developer. Using this modified machine, a non-fixed image (solid image having a size of 40 mm×50 mm, toner applied amount: 0.5 mg/cm$^2$) is formed on mirror-coated platinum paper (basis weight: 127 gsm).

The fixing device of DOCUCENTRE COLOR 500 is modified such that the fixing temperature may be varied. Using this modified fixing device, the image is fixed while increasing the fixing temperature stepwise in a range from 110° C. to 160° C. at an interval of 5° C.

Offset Elimination Temperature

The fixed image is observed by visual inspection, and a temperature at which fixing offset is eliminated is set as an offset elimination temperature. The fixed image is evaluated based on the following criteria. The fixing offset refers to a phenomenon in which an image defect is generated by toner being transferred from an image to a member such as a fixing roller or a paper feed roller. In practice, it is preferable that the fixing temperature is 150° C. or lower. Accordingly, Level C or higher is preferable.

Criteria

AA: 120° C. or lower
A: Higher than 120° C. and 130° C. or lower
B: Higher than 130° C. and 140° C. or lower
C: Higher than 140° C. and 150° C. or lower
D: Higher than 150° C.

Minimum Fixing Temperature

Immediately after the image is fixed, recording sheet is folded (the weight is placed on a folded portion) for 10 seconds using a weight with a load (60 N/m$^2$). After unfolding the recording sheet, the maximum width of an image defect in the folding line is measured. The fixing temperature at which the maximum width is 0.3 mm or less is considered as a minimum fixing temperature. This minimum fixing temperature is, in practice, preferably 150° C. or lower and more preferably 140° C. or lower.

High-Temperature Fixing Property

A modified machine of DOCUCENTRE COLOR 500 (manufactured by Fuji Xerox Co., Ltd.) from which a fixing device is removed is filled with a developer. Using this modified machine, a non-fixed image (solid image having a size of 40 mm×50 mm, toner applied amount: 0.3 mg/cm$^2$) is formed on mirror-coated platinum paper (basis weight: 127 gsm).

The fixing device of DOCUCENTRE COLOR 500 is modified such that the fixing temperature may be varied. Using this modified fixing device, the image is fixed while increasing the fixing temperature stepwise in a range from 150° C. to 200° C. at an interval of 5° C.

The fixed image is observed by visual inspection, and a temperature at which fixing offset starts to occur is set as an offset occurrence temperature. The fixed image is evaluated based on the following criteria. It is preferable that image fixing is not affected by even a fixing temperature of higher than 160° C. Accordingly, Level C or higher is preferable.

Criteria

AA: Higher than 190° C.
A: Higher than 180° C. and 190° C. or lower
B: Higher than 170° C. and 180° C. or lower
C: Higher than 160° C. and 170° C. or lower
D: 160° C. or lower

TABLE 3

| | Toner Preparing Method | Polyester | SP Value of Rosin Diol | Amount of Residual Dicarboxylic Acid (% by Weight) | Low-Temperature Fixing Property Offset Elimination Temperature | Minimum Fixing Temperature | High-Temperature Fixing Property Offset Occurrence Temperature |
|---|---|---|---|---|---|---|---|
| Example 1 | Kneading | (1) | (6) 9.04 | 1.1 | AA | 120° C. | AA |
| Example 2 | and | (2) | (1) 9.19 | 1.0 | B | 140° C. | A |
| Example 3 | Pulverizing | (3) | (3) 9.13 | 1.2 | B | 140° C. | AA |

TABLE 3-continued

| | Toner Preparing Method | Polyester | SP Value of Rosin Diol | Amount of Residual Dicarboxylic Acid (% by Weight) | Low-Temperature Fixing Property Offset Elimination Temperature | Minimum Fixing Temperature | High-Temperature Fixing Property Offset Occurrence Temperature |
|---|---|---|---|---|---|---|---|
| Example 4 | | (4) | (7) 8.78 | 1.3 | A | 130° C. | AA |
| Comparative Example 1 | | (C1) | (1) 9.19 | 2.5 | C | 150° C. | D |
| Comparative Example 2 | | (C2) | 10.1 | 1.2 | D | 170° C. | A |
| Comparative Example 3 | | (C3) | 9.52 | 1.4 | C | 150° C. | C |
| Comparative Example 4 | | (C4) | 10.5 | 3.2 | D | 170° C. | D |
| Example 5 | Coalescing | (5) | (2) 9.15 | 1.0 | A | 130° C. | A |
| Example 6 | | (6) | (4) 9.12 | 1.2 | AA | 120° C. | AA |
| Example 7 | | (7) | (6) 9.04 | 1.1 | AA | 110° C. | AA |
| Example 8 | | (8) | (7) 8.78 | 1.2 | A | 120° C. | AA |
| Example 9 | | (9) | (5) 9.07 | 1.1 | B | 140° C. | AA |
| Example 10 | | (10) | (1) 9.19 | 1.2 | B | 140° C. | AA |
| Example 11 | | (11) | (4) 9.12 | 1.0 | A | 130° C. | AA |
| Example 12 | | (12) | (4) 9.12 | 1.5 | A | 130° C. | B |
| Example 13 | | (13) | (4) 9.12 | 0.6 | AA | 120° C. | A |
| Comparative Example 5 | | (C3) | 9.52 | 1.4 | C | 150° C. | C |
| Comparative Example 6 | | (C4) | 10.5 | 3.2 | D | 160° C. | D |
| Comparative Example 7 | | (C5) | (5) 9.07 | 1.6 | D | 160° C. | AA |

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A polyester resin for toner comprising:
a repeating unit that is derived from a diol represented by the following formula (1); and
a repeating unit that is derived from a dicarboxylic acid not having a double carbon-carbon bond:

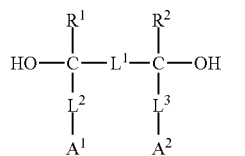

(1)

wherein $R^1$ and $R^2$ each independently represents hydrogen or a methyl group; $L^1$ represents a divalent linking group selected from the group consisting of an ether group, a chain alkylene group, a cyclic alkylene group, and combinations thereof; $L^2$ and $L^3$ each independently represent a divalent linking group selected from the group consisting of a carbonyl group, an ester group, an ether group, a sulfonyl group, a chain alkylene group, a cyclic alkylene group, an arylene group, and combinations thereof; $L^1$ and $L^2$, or $L^1$ and $L^3$ may form a ring; and $A^1$ and $A^2$ each independently represent a rosin ester group derived from a hydrogenated rosin.

2. The polyester resin for toner according to claim 1, wherein the diol represented by the formula (1) has an SP value of from 8.7 to 9.4.

3. The polyester resin for toner according to claim 1, wherein an amount of a residual dicarboxylic acid is 2.0% by weight or less.

4. The polyester resin for toner according to claim 1, wherein an amount of a residual dicarboxylic acid is 1.5% by weight or less.

5. The polyester resin for toner according to claim 1, wherein the polyester resin contains a plurality of repeating unit that is derived from alcohols and a ratio of the repeating unit that is derived from the diol represented by the formula (1) with respect to all the alcohol components is from 50% by weight to 80% by weight.

6. An electrostatic charge image developing toner comprising:
a binder resin that contains the polyester resin for toner according to claim 1.

7. The electrostatic charge image developing toner according to claim 6,
wherein the diol represented by the formula (1) has an SP value of from 8.7 to 9.4.

8. An electrostatic charge image developer comprising:
the electrostatic charge image developing toner according to claim 6; and
an electrostatic charge image developing carrier.

9. A toner cartridge comprising:
a container that accommodates the electrostatic charge image developing toner according to claim 6, and is detachable from an image forming apparatus.

10. A process cartridge comprising:
a developing unit that accommodates the electrostatic charge image developer according to claim 8 and develops an electrostatic charge image, which is formed on a surface of an image holding member, using the electrostatic charge image developer to form a toner image, wherein the process cartridge is detachable from an image forming apparatus.

11. An image forming apparatus comprising:

an image holding member;

a charging unit that charges a surface of the image holding member;

an electrostatic charge image forming unit that forms an electrostatic charge image on the charged surface of the image holding member;

a developing unit that accommodates the electrostatic charge image developer according to claim 8 and develops the electrostatic charge image, which is formed on the surface of the image holding member, using the electrostatic charge image developer to form a toner image;

a transfer unit that transfers the toner image, which is formed on the surface of the image holding member, to a surface of a recording medium; and a fixing unit that fixes the toner image transferred onto the surface of the recording medium.

* * * * *